(12) United States Patent
Yamashita et al.

(10) Patent No.: US 11,872,646 B2
(45) Date of Patent: Jan. 16, 2024

(54) RECIPROCATING TOOL

(71) Applicant: MAKITA CORPORATION, Anjo (JP)

(72) Inventors: Yuta Yamashita, Anjo (JP); Tomohiro Ukai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 143 days.

(21) Appl. No.: 17/506,257

(22) Filed: Oct. 20, 2021

(65) Prior Publication Data
US 2022/0168830 A1 Jun. 2, 2022

(30) Foreign Application Priority Data

Nov. 27, 2020 (JP) .................................. 2020-196609

(51) Int. Cl.
| | | |
|---|---|---|
| *B23D 51/00* | (2006.01) | |
| *B23D 49/16* | (2006.01) | |
| *B23D 51/10* | (2006.01) | |

(52) U.S. Cl.
CPC ........... *B23D 51/10* (2013.01); *B23D 49/165* (2013.01)

(58) Field of Classification Search
CPC ...... B23D 51/10; B23D 49/165; B23D 49/10; B23D 61/23; B23D 49/14; B23D 49/162; B23D 51/00; B23D 49/16; B23D 49/007; B27B 19/09; B27B 7/00; Y10T 83/9481; Y10T 279/17803; Y10T 279/17717
USPC .... 30/272.1, 392, 393, 394, 339; 83/699.21; 279/71–75, 81, 902, 905
See application file for complete search history.

(56) References Cited

U.S. PATENT DOCUMENTS

| | | | |
|---|---|---|---|
| 1,341,085 A | 5/1920 | Tarbutton | |
| 5,487,221 A | 1/1996 | Oda et al. | |
| 5,647,133 A | 7/1997 | Dassoulas | |
| 5,988,034 A | 11/1999 | Okubo et al. | |
| 6,260,281 B1 | 7/2001 | Okumura et al. | |
| 6,612,039 B2 | 9/2003 | Kakiuchi et al. | |
| 6,725,548 B1 * | 4/2004 | Kramer .................. | B23D 51/10 30/392 |
| 6,735,876 B2 | 5/2004 | Hirabayashi | |
| 6,848,186 B1 | 2/2005 | Chen et al. | |

(Continued)

FOREIGN PATENT DOCUMENTS

JP WO 2018221105 A1 * 4/2018 ............. B27B 19/09

*Primary Examiner* — Ghassem Alie
(74) *Attorney, Agent, or Firm* — J-TEK LAW PLLC; Jeffrey D. Tekanic; Scott T. Wakeman

(57) ABSTRACT

A reciprocating tool includes a housing, a first tubular member, a slider, a second tubular member and a lock member. The first tubular member is pivotable around a first axis and has a single first protrusion protruding radially inward. The second tubular member is disposed in the first tubular member, is coupled to a first end portion of the slider to be pivotable around a second axis, and has a single second protrusion protruding radially outward. The second tubular member has a protruding portion configured to allow the lock member to move from a lock position to an unlock position. The single first protrusion is configured to engage with the single second protrusion and cause the second tubular member to pivot when the first tubular member pivots. The single second protrusion is provided on a portion of the second tubular member other than the protruding portion.

20 Claims, 8 Drawing Sheets

(56) References Cited

U.S. PATENT DOCUMENTS

| | | | |
|---|---|---|---|
| 6,944,959 B2 | 9/2005 | Bigden et al. | |
| 7,003,888 B2 | 2/2006 | Bigden et al. | |
| 7,040,023 B2 * | 5/2006 | Nemazi | B23D 51/10 |
| | | | 279/81 |
| 7,251,897 B2 | 8/2007 | Shuhua | |
| 7,871,080 B2 | 1/2011 | Marini et al. | |
| 8,099,873 B2 | 1/2012 | Eto et al. | |
| 8,230,607 B2 | 7/2012 | Limberg et al. | |
| 8,272,135 B2 | 9/2012 | Zhou | |
| 8,813,372 B2 | 8/2014 | Scott | |
| 8,813,373 B2 | 8/2014 | Scott | |
| 9,156,097 B2 | 10/2015 | Neitzell et al. | |
| 11,065,698 B2 | 7/2021 | Cholst et al. | |
| 11,504,782 B2 * | 11/2022 | Zhou | B23D 51/10 |
| 2009/0277022 A1 * | 11/2009 | Limberg | B23D 51/10 |
| | | | 279/81 |
| 2010/0000100 A1 * | 1/2010 | Saegesser | B23D 51/10 |
| | | | 30/337 |
| 2014/0360335 A1 * | 12/2014 | Wang | B23D 51/10 |
| | | | 83/699.21 |
| 2019/0381586 A1 * | 12/2019 | Cholst | B27B 19/02 |

\* cited by examiner

RECIPROCATING TOOL

CROSS-REFERENCE TO RELATED APPLICATION

The present application claims priority to Japanese patent application No. 2020-196609 filed on Nov. 27, 2020, the contents of which are hereby fully incorporated herein by reference.

TECHNICAL FIELD

The present disclosure generally relates to a reciprocating tool that is configured to reciprocate a blade.

BACKGROUND

Known reciprocating tools (e.g., reciprocating saws, jigsaws) are configured to cut a workpiece by reciprocating a blade using mechanical power generated by an electric motor. Generally, a user needs to replace the blade, which is removably coupled to the reciprocating tool, depending on a processing operation to be performed or due to wear of the blade. For example, U.S. Pat. No. 8,230,607 discloses a reciprocating tool having a so-called keyless blade clamp system that enables the blade to be coupled to and removed from the reciprocating tool without using a specific device (e.g., without an allen wrench or special key).

SUMMARY

The above-described known clamp mechanism (keyless blade clamp system) enables a user to couple/remove the blade by simply manipulating a lever from outside a housing. However, improvements in such a clamp mechanism are possible.

Accordingly, it is one, non-limiting object of the present disclosure to disclose techniques for improving a mechanism that enables a blade to be detachably (releasably) coupled to a reciprocating tool.

In a first, non-limiting aspect of the present disclosure, a reciprocating tool includes a housing, a first tubular member, a slider, a second tubular member and a lock member. The first tubular member is supported by the housing to be pivotable (rotatable) around a first axis (e.g., first longitudinal axis of the housing) between a first position and a second position. The first axis defines a front-rear direction of the reciprocating tool. The first tubular member includes a manipulation part and a single first protrusion. The manipulation part is configured to be manipulated (by a user) from outside the housing. The single first protrusion protrudes radially inward from an inner peripheral (e.g., circumferential) surface of the first tubular member. The slider is an elongate member having (defining) a second axis (second longitudinal axis). The slider is supported within the housing to be reciprocated at least substantially in the front-rear direction along the second axis (relative to the housing and the first tubular member). The slider has a first end portion configured such that a blade can be removably (releasably) coupled (mounted, attached) thereto. The second tubular member is disposed in (inside) the first tubular member, and is coupled to the first end portion of the slider to be pivotable (rotatable) around the second axis between an engagement position and a disengagement position. The second tubular member has a single second protrusion that protrudes radially outward from an outer peripheral (e.g., circumferential) surface of the second tubular member. The lock member is disposed radially inward of the second tubular member. The lock member is configured to move in a radial direction of the second tubular member (and the slider) between a lock position and an unlock position in response to pivoting of the second tubular member between the engagement position and the disengagement position. The lock member is engageable with the blade at the lock position, while the lock member is non-engageable with the blade at the unlock position.

A portion of the second tubular member in a circumferential direction around the second axis forms (defines) a protruding portion that protrudes radially outward of a remaining portion of the second tubular member. The protruding portion is configured to allow the lock member to move to the unlock position (e.g., owing to the biasing force of a spring member). The single first protrusion is configured to engage with the single second protrusion and cause the second tubular member to pivot from the engagement position to the disengagement position when (while) the first tubular member pivots from the first position to the second position in response to manipulation of the manipulation part. The first protrusion is also configured to allow the second tubular member to pivot, without engaging with the second protrusion, when the first tubular member is at the first position. The second protrusion is provided on a portion of the second tubular member other than the protruding portion.

In the reciprocating tool of the first aspect, when (while) the first tubular member pivots from the first position to the second position in response to the manipulation of the manipulation part, the second tubular member pivots from the engagement position to the disengagement position and thus the lock member is allowed to move to the unlock position, owing to the extra space in the radial direction provided by the protruding portion of the second tubular member as compared to the remaining portion of the second tubular member. Further, the single second protrusion, which is engageable with the first single protrusion of the first tubular member, is on a portion of the second tubular member other than the protruding portion (i.e. on the remaining portion of the second tubular member). Owing to this design, a protruding length of the single second protrusion that is sufficient for engaging with the single first protrusion can be ensured, while limiting a size increase of the second tubular member as a whole (overall), inclusive of the single second protrusion, in the radial direction. Further, provision of only one first protrusion and only one second protrusion enables an arrangement of the first and second protrusions at their optimal positions, and the structures (design) of the first and second tubular members can be simplified.

In a second, non-limiting aspect of the present disclosure, a reciprocating tool includes a housing, a first tubular member, a slider, a second tubular member and a lock member. The first tubular member is supported by the housing to be pivotable (rotatable) around a first axis (e.g., first longitudinal axis of the housing) between a first position and a second position. The first axis defines a front-rear direction of the reciprocating tool. The first tubular member includes a manipulation part and a first protrusion. The manipulation part is configured to be manipulated (by a user) from outside the housing. The first protrusion protrudes radially inward from an inner peripheral (e.g., circumferential) surface of the first tubular member. The slider is an elongate member having (defining) a second axis (second longitudinal axis). The slider is supported within the housing to be reciprocated at least substantially in the front-rear direction along the second axis (relative to the housing and the first tubular member). The slider has a first end portion configured such that a blade can be removably coupled (mounted, attached) thereto. The second tubular member is disposed in (inside) the first tubular member, and coupled to the first end portion of the slider to be pivotable (rotatable) around the second axis between an engagement position and a disengagement position. The second tubular member has a second protrusion that protrudes radially outward from an outer peripheral (e.g., circumferential) surface of the second tubular member. The lock member is disposed radially inward of the second tubular member. The lock member is configured to move in a radial direction of the second tubular member (and the slider) between a lock position and an unlock position in response to pivoting of the second tubular member between the engagement position and the disengagement position. The lock member is engageable with the blade at the lock position, while the lock member is non-engageable with the blade at the unlock position.

A portion of the second tubular member in a circumferential direction around the second axis forms (defines) a protruding portion that protrudes radially outward of a remaining portion of the second tubular member. The protruding part is configured to allow the lock member to move to the unlock position (e.g., owing to the biasing force of a spring member). The first protrusion is configured to engage with the second protrusion and cause the second tubular member to pivot from the engagement position to the disengagement position when (while) the first tubular member pivots from the first position to the second position in response to manipulation of the manipulation part. The first protrusion is also configured to allow the second tubular member to pivot, without engaging with the second protrusion, when the first tubular member is at the first position. The second protrusion is provided on a portion of the second tubular member other than the protruding portion. The slider is configured to provide (impart) an orbital motion of the blade by oscillating (pivoting, rocking) in an up-down direction orthogonal to the first axis while reciprocating at least substantially in the front-rear direction along the second axis (relative to the housing and the first tubular member). The orbital motion may be, e.g., motion along an elliptical orbital path.

In the reciprocating tool of the second aspect, when (while) the first tubular member pivots from the first position to the second position in response to the manipulation of the manipulation part, the second tubular member pivots from the engagement position to the disengagement position and thus the lock member is allowed to move to the unlock position, owing to the extra space in the radial direction provided by the protruding portion of the second tubular member as compared to the remaining portion of the second tubular member. Further, the second protrusion, which is engageable with the first protrusion of the first tubular member, is on a portion of the second tubular member other than the protruding portion (i.e. on the remaining portion of the second tubular member). Owing to this design, a protruding length of the second protrusion that is sufficient for engaging with the first protrusion can be ensured, while limiting a size increase of the second tubular member as a whole (overall), inclusive of the second protrusion, in the radial direction.

DETAILED DESCRIPTION OF THE EMBODIMENTS

Figure 1:
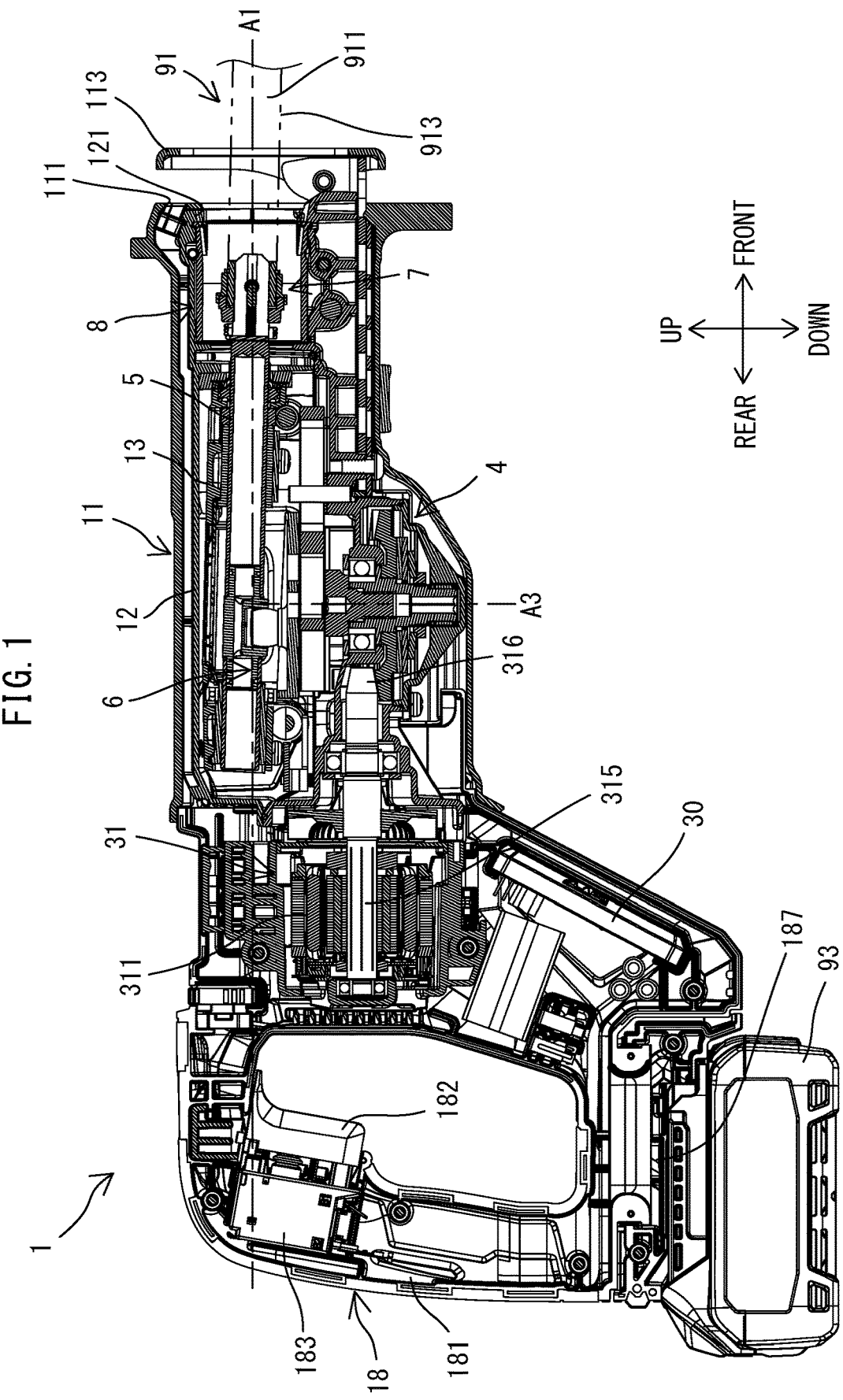
FIG. 1 is a sectional view of a reciprocating saw according to the present teachings wherein a crank plate is at a first rotational position.

In one non-limiting embodiment according to the above-described first or second aspect of the present disclosure, the slider may be configured to provide (impart) an orbital motion of (to) the blade by oscillating (pivoting, rocking) in an up-down direction orthogonal to the first axis while reciprocating at least substantially in the front-rear direction along the second axis (relative to the housing and the first tubular member). The single second protrusion may be configured to move within a range that is offset from (that does not overlap) a first plane containing the first axis and extending in the up-down direction, regardless of the position of the second tubular member, in response to the pivoting of the second tubular member between the engagement position and the disengagement position.

According to this embodiment, cutting efficiency can be enhanced owing to the orbital motion of the blade. Furthermore, in this embodiment, the position of the second axis relative to the first axis changes in the up-down direction in response to the reciprocation and the oscillation (pivoting) of the slider (which defines the second axis) relative to the housing (which defines the first axis). Therefore, the positional relationship between the first tubular member and the second tubular member may change (tilt) in the up-down direction. In a structure in which multiple first protrusions and multiple second protrusions are provided (i.e. contrary to the embodiment of the above-described first aspect that has only single first protrusion and a single second protrusion), an inappropriate or disadvantageous engagement between at least one of the first protrusions and at least one of the second protrusions may become possible, due to the change in the positional relationship (tilting) between the first tubular member (i.e. the first axis thereof) and the second tubular member (i.e. the second axis thereof) in the up-down direction. It is also noted that, in a structure in which the second protrusion were to be (hypothetically) intersected by the first plane, i.e., the second protrusion is disposed directly above or directly below the first axis (i.e. contrary to an embodiment in which the second protrusion is disposed at another position), the change in the positional relationship (tilting) between the first protrusion and the second protrusion would tend to become larger. On the other hand, according to this embodiment, only one first protrusion and only one second protrusion are provided and the second protrusion is always offset from the first plane, regardless of the position of the second tubular member relative to the first tubular member and regardless of the rotational position of the second tubular member. Consequently, the likelihood of an engagement failure (e.g., insufficient or excessive engagement) between the first protrusion and the second protrusion can be reduced or avoided.

In addition or in the alternative to the preceding embodiment, the protruding portion and the second protrusion may be on opposite sides of the first plane when the second tubular member is located at any position between the engagement position and the disengagement position. According to this embodiment, a rational arrangement of the protruding portion and the second protrusion can be achieved.

In addition or in the alternative to the preceding embodiments, when the second tubular member is at the engagement position, the single second protrusion may be disposed in an intermediate portion of a path along which the single first protrusion travels when the first tubular member pivots from the first position to the second position. In other words, the first protrusion may be configured to engage with the second protrusion in a middle stage of a process (movement) in which the first tubular member pivots from the first position to the second position. According to this embodiment, when the first tubular member is located at the first position, the likelihood that the first protrusion will interfere with the second protrusion can be reduced or avoided. The "intermediate portion" herein refers not only to the exact center of the path but also to a range that includes the center and its adjacent portions.

In addition or in the alternative to the preceding embodiments, the manipulation part may protrude radially outward from an outer peripheral (e.g., circumferential) surface of the first tubular member. The single first protrusion may be located at approximately the same position as the manipulation part in a circumferential direction of the first tubular member. According to this embodiment, a rational arrangement can be achieved that facilitates ensuring sufficient strength of the manipulation part and the single first protrusion, because the manipulation part and the single first protrusion overlap in the radial direction of the first tubular member.

In addition or in the alternative to the preceding embodiments, the housing may have an opening (e.g., a substantially rectangular opening) that extends in an up-down direction orthogonal to the first axis and that exposes the manipulation part to outside the housing (e.g., the manipulation part extends through this opening to outside of the outer surface of the housing). The manipulation part may be movable between a lower end portion and an upper end portion of the opening in response to the manipulation to the manipulation part. When the second tubular member is at the engagement position, the second protrusion may be at a position corresponding to a central portion of the opening in the up-down direction. According to this embodiment, the likelihood that the single first protrusion will interfere with the single second protrusion before the manipulation part is manipulated can be reduced or reduced.

In addition or in the alternative to the preceding embodiments, the single first protrusion may be configured to engage with the single second protrusion in response to the pivoting of the first tubular member from the first position to the second position, regardless of the position of the slider (and thus the second tubular member) in the front-rear direction. According to this embodiment, regardless of the position of the second tubular member in the front-rear direction, a user can cause the second tubular member to pivot from the engagement position to the disengagement position by simply manipulating the manipulation part to pivot the first tubular member from the first position to the second position.

In one non-limiting embodiment according to the first, second or third aspect of the present disclosure, the second protrusion may be configured to move within a range that is offset from (that does not overlap) a first plane containing the first axis and extending in the up-down direction, regardless of a position of the second tubular member, in response to the pivoting of the second tubular member between the engagement position and the disengagement position.

According to this embodiment, the likelihood of an engagement failure (e.g., insufficient or excessive engagement) between the first protrusion and the second protrusion can be reduced or avoided.

A reciprocating saw (also called a recipro saw or a saber saw) 1 according to a non-limiting, detailed embodiment of the present disclosure is now described with reference to the drawings. The reciprocating saw 1 shown in FIG. 1 is an example of a portable reciprocating tool. The reciprocating saw 1 is configured to cut a workpiece (e.g., wood, plastic material, steel, etc.) by reciprocating a thin plate-like blade 91 that is removably coupled (mounted, attached) thereto.

First, the general structure of the reciprocating saw 1 is described.

As shown in FIG. 1, an outer shell of the reciprocating saw 1 is mainly formed by a body housing (main housing) 11 and a handle 18.

The body housing 11 is a basically elongate hollow body (i.e. a shell body having an internal cavity) and includes a portion that extends along a specified longitudinal axis A1. The body housing 11 houses a motor 31, a slider 5 to which a blade 91 can be removably coupled (mounted, attached), a driving mechanism 4 interposed between the motor 31 and the slider 5 to reciprocally move the slider 5, and other mechanical or electrical components. An opening 111 is formed in one end portion of the body housing 11 in an extension direction of the longitudinal axis A1 (also simply referred to as the longitudinal direction of the body housing 11). The longitudinal axis A1 intersects (extends through) the opening 111. The blade 91, when coupled to the slider 5, extends outward of the body housing 11 through the opening 111. A shoe 113, which is configured to abut on a workpiece during a cutting operation, is detachably attached to the body housing 11 in the vicinity of the opening 111.

The handle 18 is a generally C-shaped hollow body. The handle 18 is connected to the other end portion of the body housing 11 in its longitudinal direction so as to form a loop shape (D-shape) together with a rear end portion of the body housing 11. The handle 18 includes a grip portion 181 configured to be gripped (grasped) by a user. The grip portion 181 extends in a direction that intersects (specifically, at least substantially orthogonally intersects) the longitudinal axis A1 of the body housing 11. A trigger 182 for activating (actuating) the motor 31 is disposed on the grip portion 181. The grip portion 181 houses a switch 183. A battery housing 187 is mounted on the handle 18. A rechargeable battery 93 (also referred to as a battery pack or battery cartridge), which is a power source for the reciprocating saw 1, is removably coupled to the battery housing 187. Although not shown and described in detail, the battery housing 187 is a separate (discrete) member from the handle 18, and is coupled to the handle 18 via an elastic body. However, instead of the battery housing 187, a battery-mount part, to which the battery 93 can be removably coupled, may be provided (e.g., integrally formed) in or at a lower end portion of the handle 18. The handle 18 also houses a controller 30. It is noted that reciprocating tools according to the present teachings may have two or more battery housings 187 or two or more battery-mount parts so that two or more rechargeable batteries 93 may be mounted on the reciprocating tool at the same time.

When a user depresses the trigger 182, the switch 183 is turned ON and the motor 31 is energized, so that the blade 91 is reciprocally moved at least substantially in the longitudinal direction of the body housing 11 by the driving mechanism 4, as will be further explained below.

The structure of the reciprocating saw 1 is now described in greater detail. In the following description, for the sake of convenience, the extension direction of the longitudinal axis A1 of the body housing 11 is defined as the front-rear direction of the reciprocating saw 1, as can be seen, e.g., in FIG. 1. In the front-rear direction, the side on which the opening 111 is located is defined as the front side, and the opposite side (i.e., the side on which the handle 18 is located) is defined as the rear side. The direction that is orthogonal to the longitudinal axis A1 and that is at least substantially parallel to a plate surface 911 of the blade 91 coupled to the slider 5 (or, the direction that is orthogonal to the longitudinal axis A1 and that at least approximately corresponds to the extension direction of the grip portion 181) is defined as the up-down direction of the reciprocating saw 1. In the up-down direction, the direction toward which a cutting edge 913 of the blade 91 in use is directed (faces) is defined as the downward direction, and the opposite direction thereof is defined as the upward direction. The direction that is orthogonal to both the front-rear direction and the up-down direction is defined as the left-right direction of the reciprocating saw 1, as can be seen, e.g., in FIG. 4.

First, elements/components within the body housing 11 will be described in greater detail.

As shown in FIG. 1, the body housing 11 mainly houses the motor 31, the driving mechanism 4, a support body 13, the slider 5, an orbital mechanism 6, a clamp mechanism (blade clamp mechanism) 7 and a release mechanism (blade clamp actuator) 8. The clamp mechanism 7 and the release mechanism 8 together serve as one representative, non-limiting example of a blade clamp system according to the present teachings.

The motor 31 is disposed in a rear end portion of the body housing 11. The motor 31 of the present embodiment is a brushless DC motor, but may be, e.g., a commutated (brushed) motor. The motor 31 has a body part 311, which includes a stator and a rotor, and a motor shaft (rotary shaft) 315, which is rotatable integrally with the rotor. The motor 31 is arranged such that the rotational axis of the motor shaft 315 extends in parallel to the longitudinal axis A1 of the body housing 11 (i.e., in the front-rear direction). A pinion gear 316 is formed or provided on (at) a front end portion of the motor shaft 315. The pinion gear 316 is a bevel gear. In this embodiment, the pinion gear 316 is formed integrally with the motor shaft 315 to rotate together with the motor shaft 315 around the rotational axis, but the pinion gear 316 also be a separate (discrete) part that is attached to the motor shaft 315.

In the present embodiment, the controller 30 is configured to control driving (energization) of the motor 31. Although not shown in detail, the controller 30 has a microcomputer including a CPU, a ROM, a RAM and the like. When the switch 183 is turned ON, the controller 30 causes the motor 31 to be driven (energized) by controlling the supply of current from the battery 93 via a plurality of power FETs.

In the present embodiment, the driving mechanism 4 and the slider (reciprocatable spindle) 5 are disposed frontward of the motor 31 within the body housing 11. More specifically, the driving mechanism 4 and the slider 5 are housed in a gear housing 12, as can be better seen in FIG. 2. The gear housing 12 is fixedly held within the body housing 11. Thus, the gear housing 12 and the body housing 11 may be collectively regarded as a single housing. The gear housing 12 is generally an elongate hollow body and has an opening 121 at its front end. Thus, the longitudinal axis A1 also extends through the opening 121. The slider 5 is supported by the support body 13 in the gear housing 12. The blade 91, when coupled to the slider 5, extends outward of the gear housing 12 through the opening 121.

Figure 2:
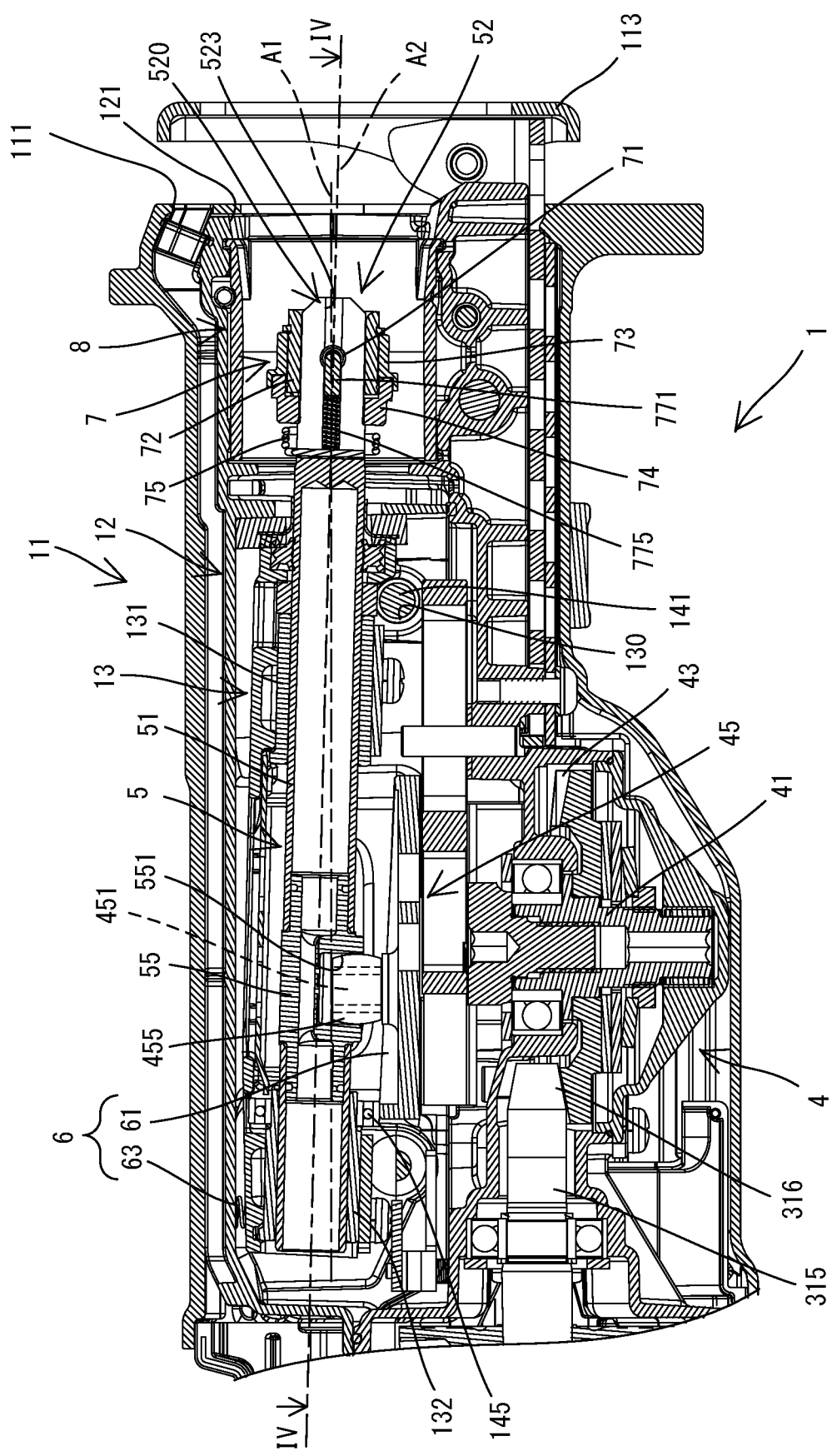
FIG. 2 is a partial, enlarged view of FIG. 1.

The driving mechanism 4 is now described. The driving mechanism 4 is configured to convert rotation of the motor shaft 315 into oscillating motion to reciprocally drive the slider 5 relative to the body housing 11, the gear housing 12 and the release mechanism 8. As shown in FIG. 2, the driving mechanism 4 of the present embodiment includes an intermediate shaft 41, a bevel gear 43 and a crank plate 45.

The intermediate shaft 41 is arranged in front of the front end portion of the motor shaft 315 in a lower end portion of the body housing 11 (the gear housing 12). The intermediate shaft 41 is rotatably supported by two bearings. The rotational axis of the intermediate shaft 41 extends in the up-down direction.

The bevel gear 43 is coaxially fixed to the intermediate shaft 41 and is rotatable integrally with the intermediate shaft 41. The bevel gear 43 is disposed below the motor shaft 315 and meshes with the pinion gear 316. Thus, the bevel gear 43 rotates together with the intermediate shaft 41 in response to driving of the motor 31.

The crank plate 45 is a circular plate member in plan view. The crank plate 45 is arranged coaxially with the intermediate shaft 41 and fixed to an upper portion of the intermediate shaft 41. Thus, the crank plate 45 rotates integrally with the intermediate shaft 41. The crank plate 45 has a crank pin (sliding pin) 451. The crank pin 451 is fixed to the crank plate 45 at a position eccentric to (offset from) the rotational axis of the crank plate 45, and protrudes upward from the upper surface of the crank plate 45. A hollow, generally cylindrical connection member (e.g., a bushing) 455 is disposed around the crank pin 451. The connection member 455 is rotatable relative to the crank pin 451 around the axis of the crank pin 451. It is noted that the driving mechanism 4 of the present embodiment may also be referred to as a Scottish yoke. Here, it is noted that the driving mechanism 4 of the present teachings is not limited to the embodiment described above, and may instead be embodied, e.g., as a slider-crank mechanism, etc., as further described below.

The support body 13 is now described. The support body 13 is an elongate member and is supported within the gear housing 12 so as to at least substantially extend in the front-rear direction. Although not shown in detail, in the present embodiment, the support body 13 includes an upper wall, a left wall and a right wall.

Sliding contact bearings (also referred to as plain bearings) 131, 132 are fixed to a front end portion and a rear end portion of the support body 13, respectively. The sliding contact bearings 131, 132 are arranged coaxially with each other, and a common axis of the sliding contact bearings 131, 132 defines a longitudinal axis of the support body 13. The slider 5 is coaxially inserted through the sliding contact bearings 131, 132. The slider 5 is thus supported by the sliding contact bearings 131, 132 to be slidable along the longitudinal axis of the support body 13. Thus, the slider 5 is axially movable relative to the support body 13. The longitudinal axis (the common axis of the sliding contact bearings 131, 132) of the support body 13 thus defines the driving axis of the slider 5.

Further, the support body 13 is supported such that the support body 13 is capable of oscillating (pivoting, rocking) in the up-down direction relative to the gear housing 12 (and thus to the body housing 11 and the release mechanism 8). More specifically, the support body 13 is coupled to the gear housing 12 via a pin 141. The pin 141 extends in the left-right direction in the gear housing 12 and opposite end portions of the pin 141 are supported by the gear housing 12. The pin 141 is inserted into support holes 130 that are respectively formed in lower front end portions of the left wall and the right wall of the support body 13. Owing to this design, the support body 13 can oscillate (pivot, rock) in the up-down direction around the axis of the pin 141 that serves as a pivot.

Figure 3:
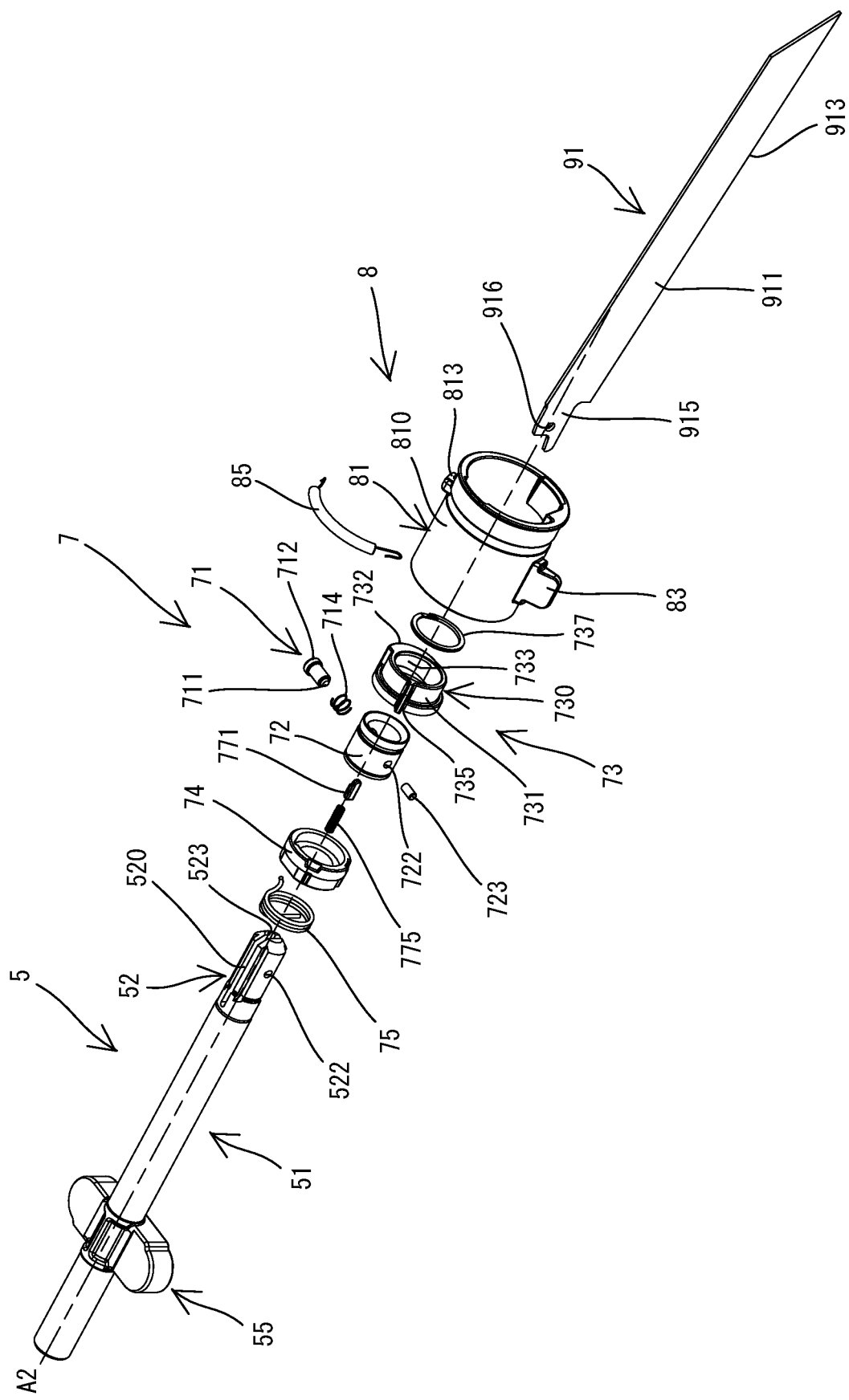
FIG. 3 is an exploded perspective view showing a slider, a clamp mechanism, a release mechanism and a blade according to the present teachings.

The slider 5 is now described. As shown in FIGS. 2 and 3, the slider 5 as a whole is an elongate member that extends linearly. The slider 5 extends at least substantially in the front-rear direction in the body housing 11 (the gear housing 12). In the present embodiment, the slider 5 includes a body 51 (e.g., a spindle, a connecting rod or more simply, a rod) and a pin connection portion 55 (e.g., a yoke).

The body 51 has a hollow cylindrical shape having a substantially uniform diameter. The body 51 has (defines) a longitudinal axis A2. The body 51 is supported by the sliding contact bearings 131, 132 of the support body 13 to extend at least substantially in the front-rear direction. The longitudinal axis A2 is located at the same position in the left-right direction as the longitudinal axis A1 of the body housing 11. Thus, the longitudinal axis A1 and the longitudinal axis A2 overlap with each other when viewed from above or from below (see FIG. 4). The front end portion of the body 51 is configured such that the blade 91 can be removably coupled (mounted, attached) thereto. More specifically, a slot 520, which is configured to removably receive the blade 91, is formed in the front end portion of the body 51. The slot 520 extends in the up-down direction from an upper end to a lower end of the body 51 and has an open front end. The front end portion of the body 51 is hereinafter also referred to as a blade mount part 52.

Figure 4:
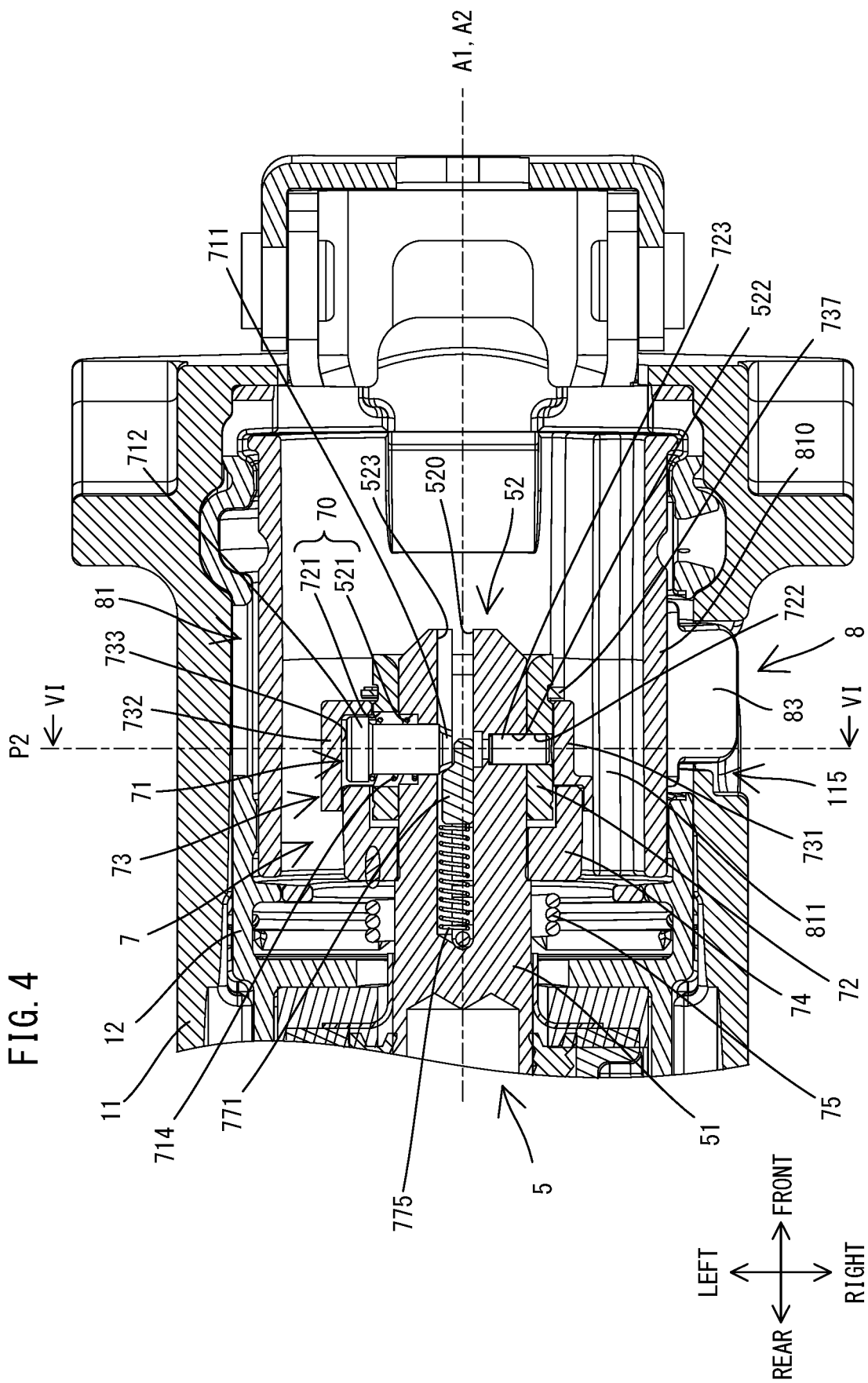
FIG. 4 is a sectional view corresponding to a sectional view taken along line IV-IV in FIG. 2, wherein the slider is at a rearmost position within its movable range.

As shown in FIG. 4, the blade mount part 52 has a first hole 521 and a second hole 522. The first hole 521 extends in a radial direction of the body 51 from a left surface of the blade mount part 52 to the slot 520. The first hole 521 is thus orthogonal to the slot 520. The first hole 521 is a stepped hole having a circular section. The portion of the first hole 521 that is closer to the longitudinal axis A2 (driving axis) of the body 51 has a diameter that is smaller than the remaining (radially outer) portion of the first hole 521 that extends to the opening (i.e. that extends to the left surface in FIG. 4). The (radially inner) portion having the smaller diameter is hereinafter referred to as a small-diameter portion, and the remaining (radially outer) portion having the larger diameter is hereinafter referred to as a large-diameter portion. The second hole 522 extends in the radial direction of the body 52 from a right surface of the blade mount part 52 to the slot 520. The second hole 52 is thus orthogonal to the slot 520. The second hole 522 has a smaller diameter than the first hole 521. The first hole 521 and the second hole 522 are aligned along a straight line.

Further, a groove 523 is formed in a wall surface of the body 51 that defines the left edge (side) of the slot 520. The groove 523 extends from a front end to a rear end of the slot 520 in parallel to the longitudinal axis of the body 51, at a central portion in the up-down direction of the slot 520. The groove 523 has a semicircular section.

The clamp mechanism 7 is operably coupled to the blade mount part 52. The clamp mechanism 7 is configured to fix (secure, attach) the blade 91, after insertion of the blade 91 into the slot 520, to the slider 5. All of the first hole 521, the second hole 522 and the groove 523 described above are provided to hold (retain) components of the clamp mechanism 7. The clamp mechanism 7 will be described in more detail below.

As shown in FIGS. 2 and 3, the pin connection portion 55 is connected to a portion of the body 51 that is slightly rearward of a central portion of the body 51 in the front-rear direction. The pin connection portion 55 and the body 51 are preferably integrally formed, but may be discrete components that are attached to each other. The pin connection portion 55 extends in the left-right direction and is thus orthogonal to the longitudinal axis A2 of the body 51 (i.e., to the driving axis of the slider 5). The width in the left-right direction of the pin connection portion 55 is larger than the diameter of the body 51. A left end portion and a right end portion of the pin connection portion 55 protrude leftward and rightward, respectively, from the body 51. A guide recess 551, which is recessed upward, is formed in a lower portion of the pin connection portion 55. The guide recess 551 extends over substantially the entire length of the pin connection portion 55 in the left-right direction.

The pin connection portion 55 is operably coupled to the crank pin 451. More specifically, an upper portion of the crank pin 451, around which the connection member 455 is fitted, is inserted into the guide recess 551. The width of the guide recess 551 in the front-rear direction is substantially equal to the maximum diameter of the connection member 455. The length in the left-right direction of the guide recess 551 is slightly larger than the diameter of the orbital path of the connection member 455 around the rotational axis of the crank plate 45.

Owing to this design, the crank pin 451 is movable in the left-right direction within the guide recess 551 while forward and rearward movement of the crank pin 451 relative to the guide recess 551 is restricted (blocked). When the crank plate 45 rotates together with the intermediate shaft 41, the crank pin 451 revolves (orbits) around the rotational axis of the crank plate 45. At this time, only the movement components in the front-rear direction of the revolving motion of the crank pin 451 are transmitted to the pin connection portion 55, so that the slider 5 is reciprocated (reciprocally moved) substantially in the front-rear direction along the driving axis relative to the support body 13. In this manner, the crank plate 45 having the crank pin 451, and the pin connection portion 55 of the slider 5 serve as a motion converting mechanism that converts the rotation of the motor shaft 315 into the linear reciprocating motion of the slider 5.

The orbital mechanism 6 is now described in more detail. The orbital mechanism 6 is configured to oscillate (pivot, rock) the slider 5 in the up-down direction while the slider 5 is reciprocating, so as to move the blade 91 along an elliptical orbital path. In the following description, movement of the blade 91 along the elliptical orbital path is also referred to as orbital motion or orbital action.

Figure 5:
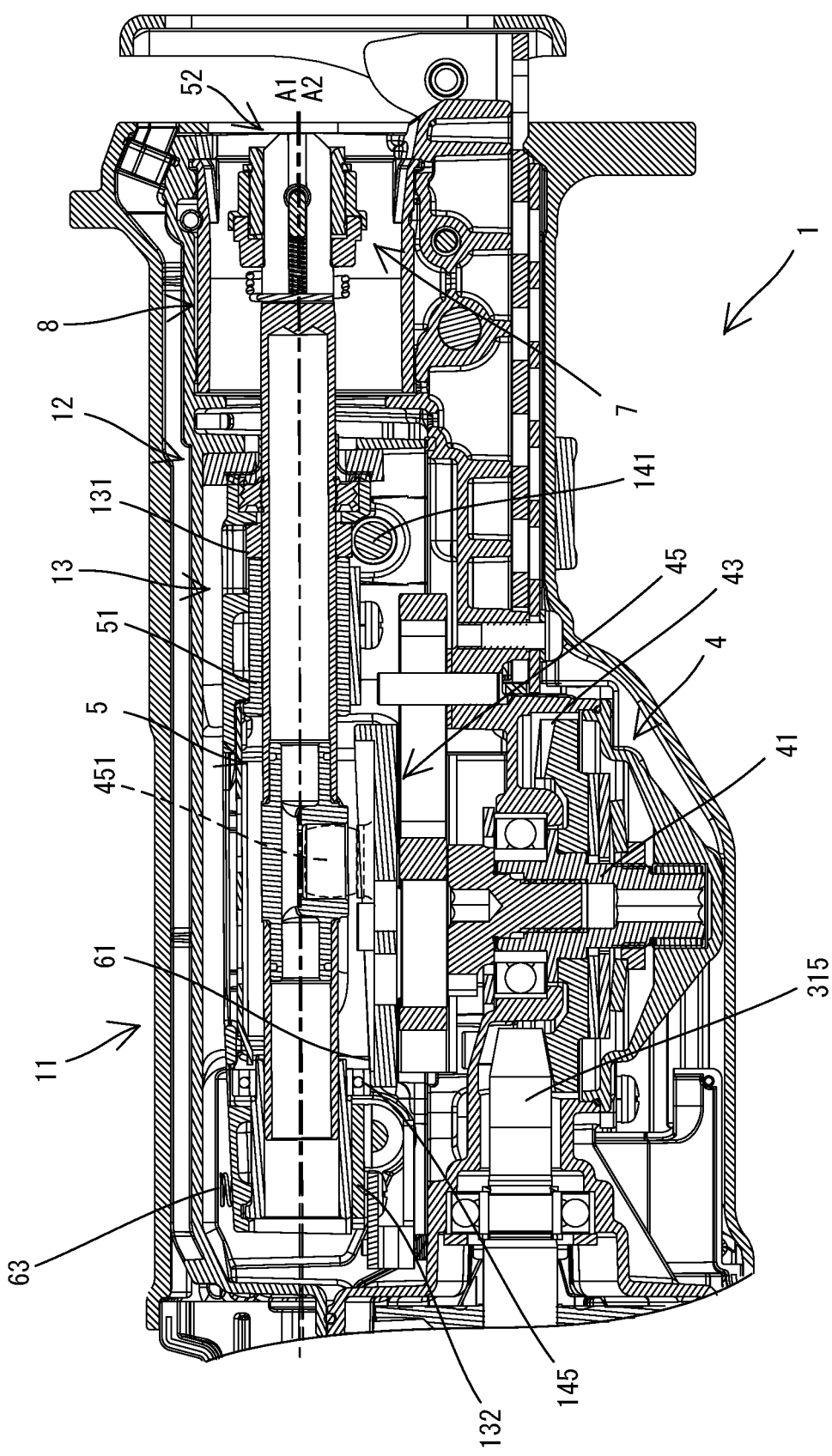
FIG. 5 is a sectional view corresponding to FIG. 2, wherein the crank plate is at a second rotational position.

In the present embodiment, the orbital mechanism 6 causes (brings about) the orbital motion of the blade 91 by oscillating (pivoting, rocking) the support body 13 in the up-down direction while the slider 5 is reciprocated in the front-rear direction by the driving mechanism 4. As shown in FIGS. 2 and 5, the orbital mechanism 6 of the present embodiment includes a cam part 61 and biasing members 63. Here, it is noted that first and second biasing members 63 of the present embodiment are respectively disposed at a left end portion and a right end portion of the support body 13, but only one of the biasing members 63 is shown in FIGS. 2 and 5.

The cam part 61 is provided or defined on the crank plate 45 described above. The cam part 61 is an annular portion formed along the outer edge portion of the crank plate 45 and protrudes upward from the upper surface of the crank plate 45. The amount that the cam part 61 protrudes upward from the upper surface of the crank plate 45 (i.e., the thickness of the cam part 61 in the up-down direction) varies along the circumferential direction of the cam part 61. That is, the cam part 61 has a rising and declining profile. More specifically, as shown in FIG. 2, the cam part 61 is configured such that, when the thickest portion of the cam part 61 is located at its rearmost position, the upper end surface (cam surface) of the cam part 61 slopes downward and forward relative to a virtual plane that is orthogonal to the rotational axis of the intermediate shaft 41.

In the following description, the rotational position of the crank plate 45 when the thickest portion of the cam part 61 is at the rearmost position, as shown in FIG. 2, is referred to as the first rotational position. Further, the rotational position of the crank plate 45 when the thinnest portion of the cam part 61 is at its rearmost position, as shown in FIG. 5, is referred to as the second rotational position. When the crank plate 45 is at (in) the first rotational position, the slider 5 is slightly forward of its rearmost position within its movable range in the front-rear direction. When the crank plate 45 is at (in) the second rotational position, the slider 5 is slightly rearward of its foremost position within its movable range in the front-rear direction.

The biasing members 63 are arranged between a lower surface of an upper wall of the gear housing 12 and an upper surface of the upper wall of the support body 13. In the present embodiment, each of the biasing members 63 comprises a compression coil spring. The biasing members 63 are each compressed between a rear end portion of the gear housing 12 and a rear end portion of the support body 13, so that the biasing members 63 always bias the rear end portion of the support body 13 downward relative to the body housing 11 (the gear housing 12). In other words, the biasing members 63 bias the support body 13 in a direction in which the front end portion of the support body 13 (the blade 91) oscillates (pivots, rocks) upward.

A rolling-element bearing 145, e.g., a ball bearing, is fitted around an outer periphery of a front end portion of the rear sliding contact bearing 132 mounted on the support body 13. An inner ring of the rolling-element bearing 145 is press-fitted around (on) the sliding contact bearing 132 and thus is fixed thereto. An outer ring of the rolling-element bearing 145 is rotatable around the driving axis of the slider 5 relative to the support body 13. A rear end portion of the crank plate 45 (a portion of the cam part 61) is directly below the rolling-element bearing 145 in the up-down direction. As described above, the rear end portion of the support body 13 is biased downward (i.e., in the direction that the rolling-element bearing 145 approaches the cam part 61) by the biasing members 63. Thus, the rolling-element bearing 145 abuts the cam part 61 of the crank plate 45 from above and is held in contact with the cam part 61.

When the motor 31 is driven and the crank plate 45 rotates, because the rolling-element bearing 145 is in contact with the cam part 61, the rolling-element bearing 145 moves in the up-down direction following the upper surface (cam surface) of the cam part 61 while the outer ring of the rolling-element bearing 145 rotates relative to the inner ring of the rolling-element bearing 145 so that rotation of the cam part 61 is not transmitted to the sliding contact bearing 132. That is, the thickness of the portion of the cam part 61 that is abutting the rolling-element bearing 145 changes in response to the rotation of the crank plate 45. Accordingly, the rolling-element bearing 145 moves in the up-down direction as the crank plate 45 rotates. More specifically, as shown in FIG. 2, when the crank plate 45 is at the first rotational position, the rolling-element bearing 145 is abutting on the thickest portion of the cam part 61. At this time, the rolling-element bearing 145 is at its uppermost position within a range in which the rolling-element bearing 145 moves upward and downward in contact with the cam part 61. On the other hand, as shown in FIG. 5, when the crank plate 45 is at the second rotational position, the rolling-element bearing 145 is abutting on the thinnest portion of the cam part 61. At this time, the rolling-element bearing 145 is at its lowermost position within the range in which the bearing 145 moves upward and downward in contact with the cam part 61.

In the above-described structure, the support body 13 oscillates (pivots, rocks) in the up-down direction around the pin 141 (the pivot) relative to the gear housing 12 in response to the rotation of the crank plate 45 (i.e., in response to the reciprocating movement of the slider 5). The blade 91 is thus driven in the orbital motion, such that the blade 91 oscillates (pivots, rocks) upward while moving forward and oscillates (pivots, rocks) downward while moving rearward. Accordingly, the positional relationship between the longitudinal axis A1 of the body housing 11 and the longitudinal axis A2 of the slider 5 (the body 51) in the up-down direction changes (tilts) in response to the reciprocating movement of the slider 5.

The clamp mechanism 7 is now described in more detail.

As shown in FIGS. 2 to 4, the clamp mechanism 7 is operably coupled to the front end portion of the slider 5 (the blade mount part 52). In the present embodiment, the clamp mechanism 7 mainly includes a lock pin (shoulder pin) 71, a guide sleeve 72, a driving sleeve (collar) 73, a connection sleeve 74 and a biasing spring 75.

Figure 6:
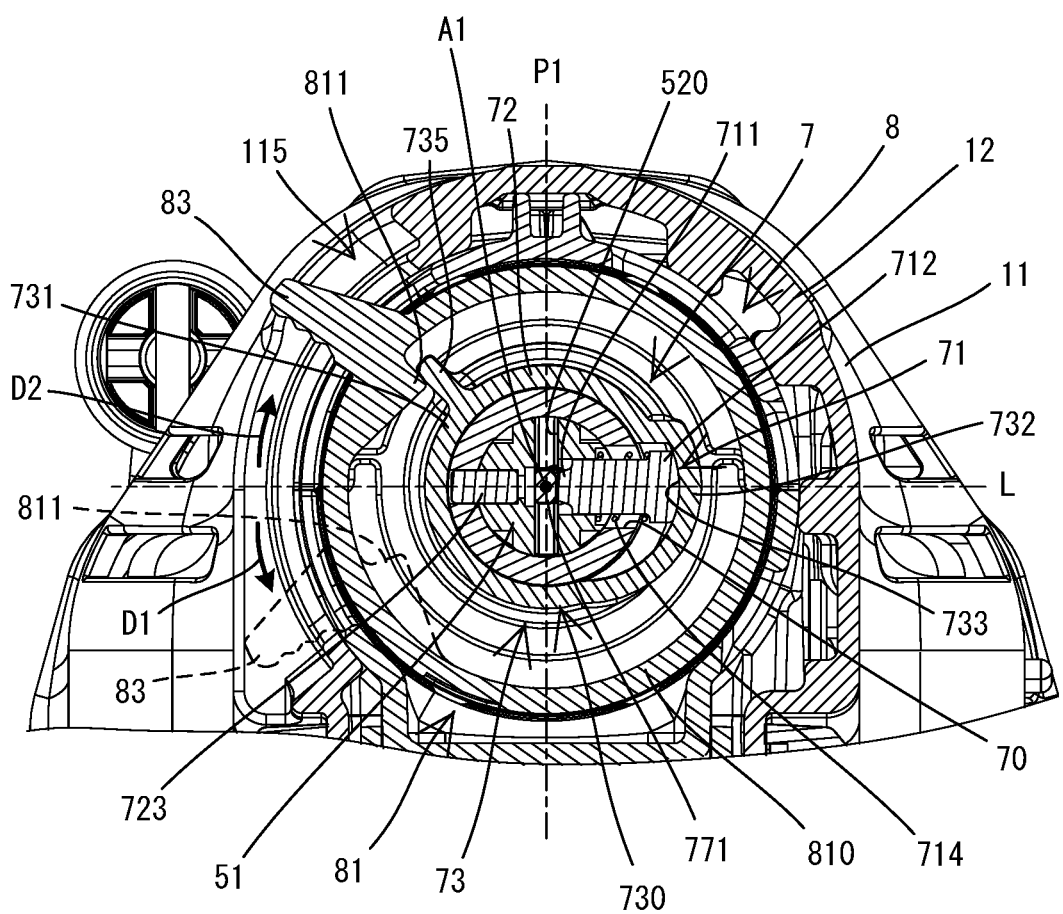
FIG. 6 is a sectional view taken along line VI-VI in FIG. 4.
Figure 6:
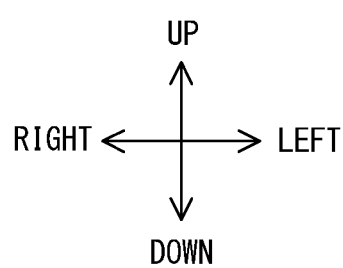

As shown in FIGS. 3, 4 and 6, the lock pin 71 has an overall solid cylindrical shape. An intermediate portion of the lock pin 71 between its two axial end portions has an at least substantially uniform diameter. One of the axial end portions of the lock pin 71 is tapered toward its tip end. The other axial end portion of the lock pin 71 (i.e. the head or shoulder of the lock pin 71) has a larger diameter than the other portions of the lock pin 71. In the following description, the tapered end portion of the lock pin 71 is referred to as a tip end portion 711 and the other end portion having the larger diameter is referred to as a head portion 712. The tip end portion 711 is engageable with (insertable in) an engagement hole 916 formed in a base end portion 915 of the blade 91 (the blade end portion to be coupled to the blade mount part 52). The head portion 712 has a curved edge surface, which has a slightly protruding central portion. In the present embodiment, the lock pin 71 is held in the first hole 521 of the body 51 of the slider 5 and in a first hole 721 of the guide sleeve 72 mounted on the body 51, so that the lock pin 71 is movable (slidable) in a radial direction relative to the body 51.

The guide sleeve 72 is a hollow cylindrical member and is disposed around (radially outward of) the blade mount part 52. More specifically, the guide sleeve 72 has an inner diameter that is at least approximately the same diameter as (slightly larger than) the blade mount part 52. The guide sleeve 72 is coaxially fitted around the blade mount part 52, and fixed to the blade mount part 52 by a pin 723, which is further described below. The front end portion of the blade mount part 52 extends forward from the front end of the guide sleeve 72.

As shown in FIG. 4, the guide sleeve 72 has the first hole 721 and a second hole 722. The first hole 721 and the second hole 722 face each other across an axis of the guide sleeve 72. Thus, the first hole 721 and the second hole 722 are aligned along one straight line that extends in a radial direction of the guide sleeve 72. The diameter of the first hole 721 is at least substantially the same as or slightly larger than the diameter of the large-diameter portion of the first hole 521 of the blade mount part 52. The diameter of the second hole 722 is at least substantially the same as the diameter of the second hole 522 of the blade mount part 52.

The guide sleeve 72 is positioned on the blade mount part 52 by fitting the pin 723 into the second hole 722 of the guide sleeve 72 and into the second hole 522 of the blade mount part 52 and is thus coupled (fixed) to the blade mount part 52 to be immovable relative to the slider 5. The first hole 721 of the guide sleeve 72 is arranged radially outward of the first hole 521 of the blade mount part 52 and communicates with the first hole 521. A continuous hole formed by the first hole 521 and the first hole 721 is also referred to as a pin holding hole 70.

The lock pin 71 is inserted into and held by the pin holding hole 70 such that the head portion 712 is directed radially outward. The diameter of the lock pin 71 is substantially the same as the diameter of the small-diameter portion of the first hole 521 of the blade mount part 52. Thus, the lock pin 71 is slidable in the radial direction within the pin holding hole 70 along the small-diameter portion. The length of the lock pin 71 is set such that the end surface of the head portion 712 at least protrudes radially outward of an outer peripheral surface of the guide sleeve 72 when the tip end of the lock pin 71 (the tip end of the tip end portion 711) is retracted from (is not disposed in) the slot 520 (i.e., when the tip end of the lock pin 71 is moved radially outward of the slot 520).

A biasing spring 714 is disposed in the pin holding hole 70. The biasing spring 714 is a compression coil spring that is mounted (disposed) around the lock pin 71. The two opposite end portions of the biasing spring 714 are respectively in contact with a shoulder portion (a stepped portion between the small-diameter portion and the large-diameter portion) of the first hole 521 and with the radially-inward side of the head portion 712 of the lock pin 71. The biasing spring 714 biases the lock pin 71 radially outward (i.e., in a direction away from the slot 520).

As shown in FIGS. 3, 4 and 6, the driving sleeve 73 is a tubular member that is disposed around (radially outward of) the guide sleeve 72 and the lock pin 71 to be coaxial with the body 51 of the slider 5. The driving sleeve 73 includes a tubular wall 730 and one protrusion (ridge, flange) 735. The driving sleeve 73 is configured to move (push) the lock pin 71 radially inward against the biasing force of the biasing spring 714, or to permit the lock pin 71 to move radially outward due to the biasing force of the biasing spring 714, depending on the rotational position of the driving sleeve 73 relative to the body 51 and the guide sleeve 72, as will be further described below.

The tubular wall 730 surrounds (encircles) the guide sleeve 72 and the lock pin 71. The tubular wall 730 has a substantially uniform thickness over its entire circumference. A major portion of the tubular wall 730 (specifically, a portion that covers approximately three-quarters of the tubular wall 730 in its circumferential direction) is a wall portion that corresponds to a portion of a hollow circular cylinder centered around the longitudinal axis A2 (the driving axis) of the body 51 (i.e., a wall portion that is arranged along a portion of a circumference of a circle centered around the longitudinal axis A2). This wall portion is hereinafter referred to as a base portion 731.

The remaining portion of the tubular wall 730 (specifically, a portion that covers approximately one-quarter of the tubular wall 730 in the circumferential direction) is arranged (extends, protrudes) radially outward of the circumference of the circle centered around the longitudinal axis A2. Thus, a portion of the tubular wall 730 in its circumferential direction protrudes radially outward relative to the other portion, i.e., relative to the base portion 731. An inner peripheral (curved) surface of this protruding portion is configured to cooperate together with the end surface of the head portion 712 of the lock pin 71 to move the lock pin 71 in the radial direction in response to pivoting (rotation) of the driving sleeve 73 relative to the body 51 and the guide sleeve 72, as can be seen in FIG. 6. Thus, this protruding portion of the tubular wall 730 is hereinafter referred to as a cam part 732, and the inner peripheral surface of the cam part 732 is referred to as a cam surface 733. The cam part 732 is configured such that the radial distance between the axis of the driving sleeve 73 (the longitudinal axis A2 of the body 51) and the cam surface 733 gradually increases in a counterclockwise direction (the direction of arrow D1 in FIG. 6) as seen from the front side of the reciprocating saw 1. In other words, one end portion of the cam surface 733 in the circumferential direction is farther from the longitudinal axis A2 in the radial direction (i.e., a circumferential end portion on the counterclockwise side as seen from the front) and this one end portion is hereinafter referred to as a first end portion. The other end portion of the cam surface 733 in the circumferential direction is closer to the longitudinal axis A2 in the radial direction (i.e., a circumferential end portion on the clockwise side as seen from the front) and this other end portion is hereinafter referred to as a second end portion.

The protrusion 735 protrudes radially outward from a portion of the tubular wall 730 other than the cam part 732. In other words, the protrusion 735 protrudes radially outward from the base portion 731, such that the protrusion 735 is not placed on the portion of the tubular wall 730 that is arranged (extends, protrudes) radially outward of the circumference of the circle centered around the longitudinal axis A2. The radial distance between the axis of the driving sleeve 73 (the longitudinal axis A2) and the tip end of the protrusion 735 is longer than the radial distance between the axis of the driving sleeve 73 (the longitudinal axis A2) and the outer surface of the portion of the cam part 732 that protrudes most radially outward. Thus, the length that the protrusion 735 protrudes from the axis of the driving sleeve 73 (i.e. from the longitudinal axis A2) is larger than the maximum protrusion length of the cam part 732 from the axis of the driving sleeve 73. In the present embodiment, the protrusion 735 also extends linearly in the front-rear direction from the front end to the rear end of the driving sleeve 73 (see FIG. 3).

In the present embodiment, the driving sleeve 73 is coupled to the body 51 via the connection sleeve 74 and the biasing spring 75.

The connection sleeve 74 is configured to operably couple the driving sleeve 73 to the body 51. The connection sleeve 74 is a hollow cylindrical member that is disposed around (radially outward of) the blade mount part 52 to be coaxial with the body 51. More specifically, the connection sleeve 74 is a bottomed hollow cylindrical member having a bottom wall and a peripheral wall. A through hole is formed in the bottom wall of the connection sleeve 74. The diameter of the through hole is substantially the same as the diameter of the blade mount part 52. The peripheral wall protrudes from an outer edge of the bottom wall. The connection sleeve 74 is fitted around the blade mount part 52 behind the guide sleeve 72 such that the bottom wall is located at the rear and the peripheral wall protrudes forward from the bottom wall. A rear end portion of the guide sleeve 72 is arranged in an annular space formed between the blade mount part 52 and the peripheral wall of the connection sleeve 74.

Although not shown in detail, multiple rectangular recesses are formed on a front end portion of the peripheral wall of the connection sleeve 74. Corresponding to these recesses, multiple matching projections are formed on a rear end portion of the driving sleeve 73. The driving sleeve 73 is coupled to the connection sleeve 74 from the front side of the connection sleeve 74 such that the projections of the driving sleeve 73 respectively engage with the recesses of the connection sleeve 74. A front end portion of the guide sleeve 72 (i.e., the portion forward of the first hole 721) protrudes forward from a front end of the driving sleeve 73. The driving sleeve 73 is positioned in the front-rear direction by a retaining ring 737 fixed to the guide sleeve 72 in front of the driving sleeve 73. Owing to this connection structure, the driving sleeve 73 and the connection sleeve 74 are integrated with each other so as to rotate together around the longitudinal axis A2 of the body 51.

As shown in FIGS. 2, 3 and 4, the biasing spring 75 is a torsion coil spring. One end portion of the biasing spring 75 extends in a diametrical direction of the coil. This one end portion is fitted and secured in the slot 520 of the blade mount part 52 and held in contact with a wall surface that defines a rear end of the slot 520. The other end portion of the biasing spring 75 is fitted and secured in an engagement hole formed in the connection sleeve 74. The biasing spring 75 biases the connection sleeve 74 and the driving sleeve 73 relative to the slider 5, the guide sleeve 72 and the lock pin 71 in the counterclockwise direction (in the direction of arrow D1 in FIG. 6) as viewed from the front.

Specifically, the biasing spring 75 rotationally biases the driving sleeve 73 relative to the head portion 712 of the lock pin 71 such that the portion of the cam surface 733, which has the shorter radial distance from the longitudinal axis A2, comes into contact with the head portion 712. Thus, the cam surface 733 contacts the end surface (curved surface) of the head portion 712 and presses the lock pin 71 radially inward (i.e., in the direction in which the tip end portion 711 of the lock pin 71 protrudes into the slot 520, and thus in the direction in which the lock pin 71 will engage with the blade 91). The counterclockwise direction, as viewed from the front, is thus hereinafter also referred to as an engagement direction.

Figure 7:
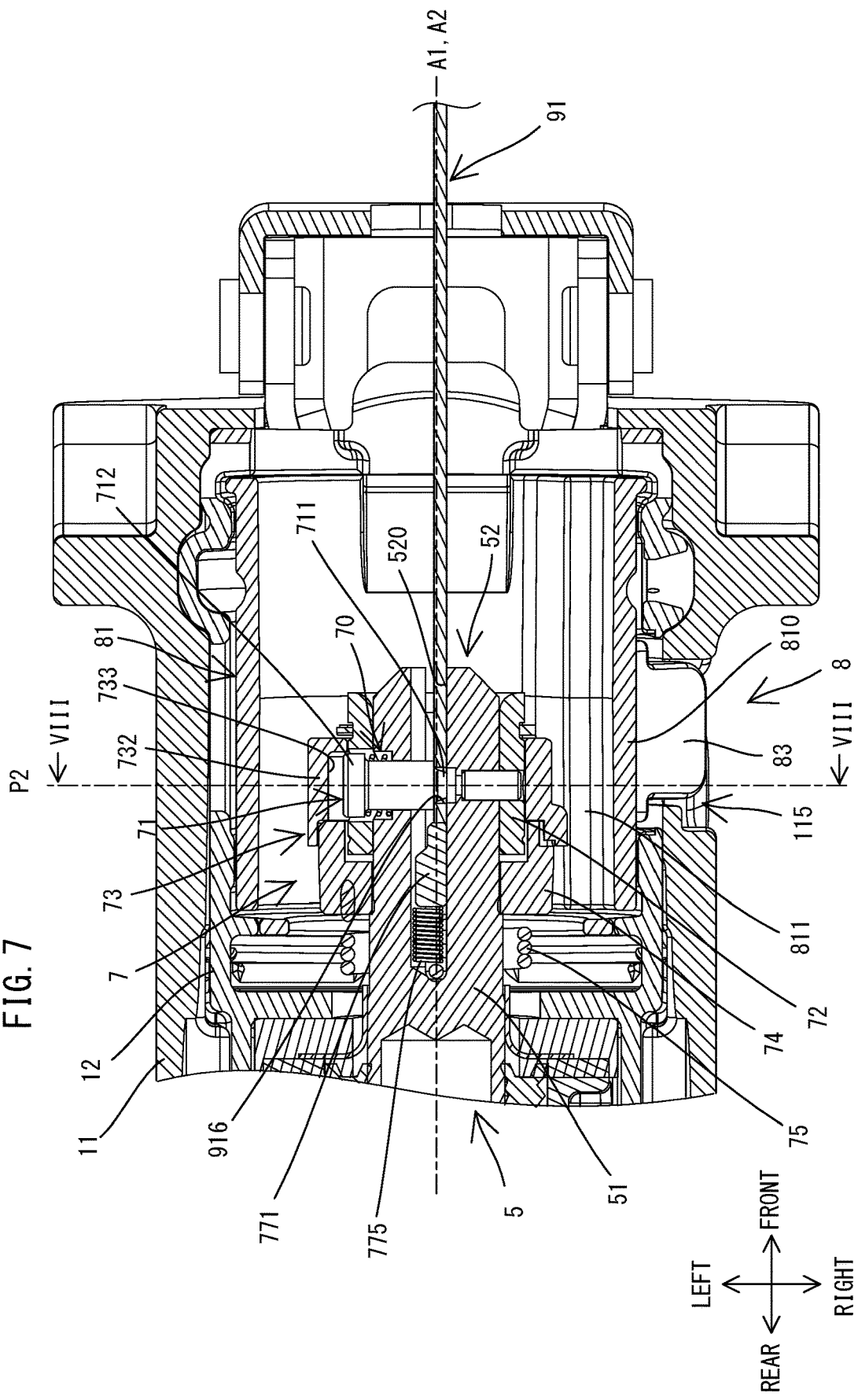
FIG. 7 is a sectional view corresponding to FIG. 4, wherein the blade is coupled to the reciprocating saw.
Figure 8:
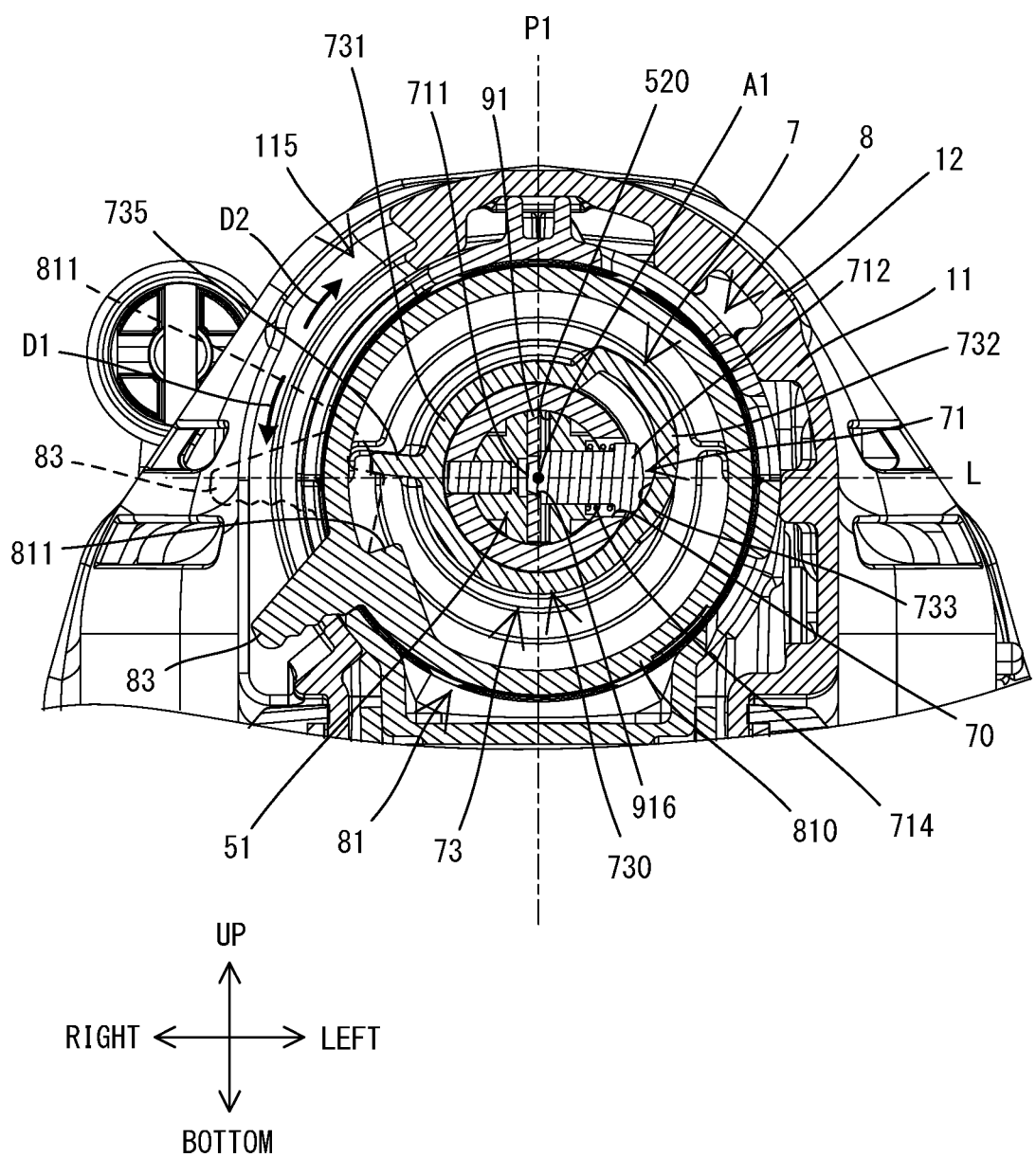
FIG. 8 is a sectional view taken along line in FIG. 7.

In the present embodiment, as shown in FIGS. 7 and 8, the lock pin 71 engages with the blade 91 at a position where the tip end portion 711 engages in the engagement hole 916 of the blade 91 that has been inserted into the slot 520 (i.e., at the position where the tip end portion 711 protrudes into the slot 520). When the lock pin 71 and the blade 91 are engaged with each other, as shown in FIG. 8, the driving sleeve 73 is located at a position where the second end portion of the cam surface 733, which is closer to the longitudinal axis A2 and which is on the clockwise side in the circumferential direction as viewed from the front side, is in contact with the end surface of the head portion 712, thereby pressing the head portion 712 radially inward. The position of the lock pin 71 at this time (the position of the lock pin 71 where the lock pin 71 is engageable with the blade 91) is hereinafter referred to as a lock position. The position of the driving sleeve 73 that places the lock pin 71 in (at) the lock position is hereinafter referred to as an engagement position.

On the other hand, as shown in FIG. 6, when the driving sleeve 73 is located at a position where the first end portion of the cam surface 733, which is farther from the longitudinal axis A2 and which is on the counterclockwise side in the circumferential direction when seen from the front side, is in contact with the end surface of the head portion 712, the lock pin 71 is not blocked from moving out of the slot 520 and is, in fact, moved out of the slot 520 owing to the biasing force of the biasing spring 714. Thus, the tip end portion 711 of the lock pin 71 is placed radially outward of (to the left of) the slot 520, so that the lock pin 71 is non-engageable (can not engage) with the blade 91. The position of the lock pin 71 at this time (the position of the lock pin 71 where the lock pin 71 is non-engageable with the blade 91) is hereinafter referred to as an unlock position. The position of the driving sleeve 73 that allows the lock pin 71 to move radially outward to the unlock position (to move out of the slot 520) is hereinafter referred to as a disengagement position.

As shown in FIGS. 3, 4 and 6, in the present embodiment, the clamp mechanism 7 further includes a push plate 771 and a biasing spring 775.

The push plate 771 is disposed in the slot 520 and the groove 523 to be slidable in the front-rear direction along the groove 523. A rear half of the push plate 771 has a generally D-shaped section to be engageable with the slot 520 and the groove 523. On the other side, a front half of the push plate 771 has a parallelepiped shape having substantially the same width as the slot 520 in the left-right direction, and is arranged only within the slot 520. The biasing spring 775 is a compression coil spring that is arranged rearward of the push plate 771. One end of the biasing spring 775 is in contact with the one end portion of the biasing spring 75 held in the rear end portion of the slot 520, and the other end of the biasing spring 775 is in contact with the rear end of the push plate 771. The push plate 771 moves in the front-rear direction in response to the movement of the lock pin 71, as will be further described below.

The release mechanism 8 is now described. The release mechanism 8 is configured to release (undo) the clamping (fixing, securing, attaching) of the blade 91 by the clamp mechanism 7. As shown in FIGS. 3, 4 and 6, the release mechanism 8 of the present embodiment includes a release drum (sleeve, collar) 81 and a biasing spring 85.

The release drum 81 is a hollow cylindrical member and is disposed around the clamp mechanism 7. In the present embodiment, the release drum 81 includes a tubular wall 810, a single protrusion (cam member, wing) 811 and a lever (tab, blade clamp lever) 83. The release drum 81 remains at least substantially axially stationary relative to the body housing 11 and gear housing 12 during a cutting operation, i.e. while the slider 5 and blade 91 are undergoing orbital, reciprocating (axial) motion relative to the body housing 11, the gear housing 12 and the release drum 81.

The tubular wall 810 is a wall that defines a hollow circular cylinder having a substantially uniform diameter, such that a cavity is defined within the inner peripheral surface of the wall. As will be discussed below, the clamp mechanism 7 is disposed within this cavity. The tubular wall 810 is arranged within the front end portion of the gear housing 12 (in a cavity extending from the opening 121 toward the inside of the gear housing 12) such that an axis of the tubular wall 810 coincides with the longitudinal axis A1 of the body housing 11, and is supported by the gear housing 12 to be pivotable (rotatable) around the longitudinal axis A1. Thus, the longitudinal axis A1 of the body housing 11 is the pivot axis (rotational axis) of the release drum 81. Although not shown in detail, axial and radial movement of the tubular wall 810 (the release drum 81) (i.e. movement in the front-rear direction and in its radial direction) are restricted by ribs provided (defined) on the inner surface of the gear housing 12, as can be seen in FIG. 6. The length in the front-rear direction and the arrangement of the tubular wall 810 are set such that the tubular wall 810 surrounds the driving sleeve 73 both when the slider 5 is at (in) its rearmost position and when the slider 5 is at (in) its foremost position. In other words, the length in the front-rear direction and the arrangement of the tubular wall 810 are set to cover the entire movable range of the driving sleeve 73, relative to the release drum 81, in the front-rear direction.

The protrusion 811 protrudes radially inward from an inner peripheral surface of the tubular wall 810, as can best be seen in FIG. 6. The (single) protrusion 811 is configured to operably (releasably) engage with (abut) the (single) protrusion 735 of the driving sleeve 73. In response to pivoting of the release drum 81, the protrusion 811 pivots the driving sleeve 73 via the protrusion 735, as will be described below, i.e. the engagement of the protrusion 811 and the protrusion 735 causes rotational motion of the release drum 81 to be translated to (exerted onto) the driving sleeve 73. In the present embodiment, the protrusion 811 extends in the radial direction to a substantially intermediate (middle, center) position between an outer peripheral surface of the tubular wall 730 of the driving sleeve 73 and the inner peripheral surface of the release drum 81. The protrusion 735 of the driving sleeve 73 extends radially outward of the intermediate position between the outer peripheral surface of the tubular wall 730 and the inner peripheral surface of the tubular wall 810. Thus, the length that the protrusion 735 protrudes from the outer peripheral surface of the tubular wall 730 in the radial direction is larger than the length that the protrusion 811 protrudes from the inner peripheral surface of the tubular wall 810 in the radial direction.

The protrusion 811 linearly extends from a front end to a rear end of the tubular wall 810 in the front-rear direction, in parallel to the axis (the longitudinal axis A1) of the tubular wall 810 (the release drum 81), as can be seen in FIG. 4. As described above, the driving sleeve 73 moves generally in the front-rear direction in response to the reciprocation of the slider 5. Therefore, the protrusion 811 extends over the entire length of the tubular wall 810 in the front-rear direction, so that the protrusion 811 is always engageable with the protrusion 735, regardless of the position of the driving sleeve 73 in the front-rear direction relative to the release drum 81. However, the protrusion 811 may be shorter than the entire length of the tubular wall 810 in the front-rear direction, as long as the protrusion 811 is always engageable with the protrusion 735 regardless of the position of the driving sleeve 73 within its front-rear movable range relative to the release drum 81.

The lever (tab, blade clamp lever) 83 is configured to be manually manipulated by a user. The lever 83 protrudes radially outward from the outer peripheral surface of the tubular wall 810. In the present embodiment, the lever 83 is shaped like a substantially rectangular plate. However, the lever 83 may have any other shape, such a square, curved, semi-circular, triangular, etc. The lever 83 is formed integrally with the tubular wall 810. However, the lever 83 and the tubular wall 810 may be separate (discrete) members that are connected together. In the present embodiment, the lever 83 and the protrusion 811 are positioned at substantially the same position in the circumferential direction of the tubular wall 810, as can be seen in FIG. 6. In other words, a portion of the lever 83 and a portion of the protrusion 811 are located on (intersected by) a straight line that extends in the radial direction of the tubular wall 810. Such arrangement serves to provide sufficient strength for each of the lever 83 and the protrusion 811, because the lever 83 and protrusion 811 are located in the same radial section of the tubular wall 810 (i.e. such that the thickness of the tubular wall 81 is its largest at the location of the lever 83 and the protrusion 811).

An opening is formed in a right wall of the front end portion of the body housing 11. An opening is also formed in a right wall of the front end portion of the gear housing 12. The opening of the body housing 11 and the opening of the gear housing 12 communicate with each other to form a hole (hereinafter referred to as a lever insertion hole 115) that allows the lever 83 to be inserted therethrough and exposed to the outside. The lever insertion hole 115 is a generally rectangular hole that is longer in the up-down direction than in the front-rear direction and curves along the circumference of the body housing 11. The length of the lever insertion hole 115 is slightly larger than the length of the lever 83 in the front-rear direction. A portion of the lever 83 protrudes generally rightward of the body housing 11 through the lever insertion hole 115. Thus, a user can manipulate the lever 83 easily from outside the body housing 11. The lever 83 is movable (pivotable) between a lower end portion of the lever insertion hole 115 and an upper end portion of the lever insertion hole 115.

The biasing spring 85 is a tension coil spring. Although not shown in detail, one end portion of the biasing spring 85 is coupled to a coupling portion 813 disposed on an outer peripheral surface of the release drum 81, and the other end portion of the biasing spring 85 is coupled to the gear housing 12.

The release drum 81 is biased by the biasing spring 85 in the counterclockwise direction (in the direction of arrow D1 in FIG. 6) as viewed from the front side of the reciprocating saw 1, and thus the release drum 81 is normally held in (at) a position (i.e., the position shown by a dashed line in FIG. 6) where the lever 83 is in contact with a lower edge of the lever insertion hole 115. The position of the release drum 81 at this time is referred to as an initial position of the release drum 81. Likewise, the position of the lever 83 at this time is referred to as an initial position of the lever 83. When the lever 83 moves upward from its initial position in response to manipulation of the user, the release drum 81 pivots in the clockwise direction (in the direction of arrow D2 in FIG. 6) as viewed from the front side, against the biasing force of the biasing spring 85.

Operations of the clamp mechanism 7 and the release mechanism 8 are now described.

First, the state in which the blade 91 is fixed (secured, attached) to the slider 5 by the clamp mechanism 7 is described.

As shown in FIGS. 7 and 8, in the state in which the blade 91 is fixed to the slider 5 by the clamp mechanism 7, as described above, the lock pin 71 engages with the blade 91 at the lock position and the driving sleeve 73 presses the lock pin 71 against the blade 91 at the engagement position. The push plate 771 is held in (at) a position where the front end of the push plate 771 is in contact with the rear end of the blade 91. The release drum 81 and the lever 83 are held in their initial positions, where the lever 83 is in contact with the lower edge of the lever insertion hole 115 of the release drum 81.

In the present embodiment, when the slider 5 is at its rearmost position as shown in FIGS. 7 and 8, the longitudinal axis A1 of the body housing 11 and the longitudinal axis A2 of the body 51 intersect a plane P2 that is orthogonal to the longitudinal axis A1 of the body housing 11 and that contains the axis of the lock pin 71 substantially at the same position (or at slightly offset positions). This plane P2 corresponds to long dash-short dash line VIII shown in FIG. 7. At this position, the protrusion 735 of the driving sleeve 73 is located in the vicinity of a straight line L (the long dash-short dash line in FIG. 8) that extends in the left-right direction along the axis of the lock pin 71 (specifically, slightly above the straight line L). Thus, the protrusion 735 and the lock pin 71 are generally aligned along the straight line L extending in the left-right direction. Further, the protrusion 735 is at a position generally corresponding to the center of the lever insertion hole 115 in the up-down direction, i.e. the center of a movable range of the lever 83 and the protrusion 811 in the up-down direction. The protrusion 811 is spaced apart downward from the protrusion 735 of the driving sleeve 73 without engaging with the protrusion 735.

Operations of the clamp mechanism 7 and the release mechanism 8 when removing (detaching, releasing, withdrawing) the blade 91 from the slider 5 are now described.

The user moves the lever 83 upward from its initial position (the position shown in FIG. 8) to pivot the release drum 81 in the clockwise direction (in the direction of arrow D2) as viewed from the front side, against the biasing force of the biasing spring 85. Thus, the protrusion 811 moves as well, along with the release drum 81. The release drum 81 reaches a position where the protrusion 811 abuts (contacts) the protrusion 735 of the driving sleeve 73 (the position shown by the long dash-short dash line in FIG. 8) from below. When the release drum 81 is further pivoted with the protrusion 811 remaining in contact with the protrusion 735, thereby pushing the protrusion 735 in the direction of arrow D2 shown in FIG. 8, the driving sleeve 73 is also pivoted in the clockwise direction as viewed from the front side. Thus, the driving sleeve 73 is pivoted from the engagement position toward the disengagement position. In response to the pivoting of the driving sleeve 73, the lock pin 71 gradually moves radially outward (toward the left side of the reciprocating saw 1 (i.e., toward the right side in FIG. 8)) from the lock position owing to the biasing force of the biasing spring 714 while the head portion 712 remains in contact with the cam surface 733.

When the user moves the lever 83 upward to the position shown in FIG. 6, thereby pivoting the release drum 81, the driving sleeve 73 reaches the disengagement position. The position of the release drum 81 at this time is hereinafter referred to as a release position of the release drum 81. Likewise, the position of the lever 83 at this time is hereinafter referred to as a release position of the lever 83. The lock pin 71 reaches the unlock position, where the tip end portion 711 has moved out of the engagement hole 916 of the blade 91 and is thus disposed outside the slot 520.

In response to disengagement (removal) of the lock pin 71 from the blade 91, the push plate 771 thus moves forward owing to the biasing force of the biasing spring 775, while remaining in contact with the rear end of the blade 91. Therefore, the push plate 771 pushes the blade 91 forward to facilitate removal of the blade 91. As shown in FIGS. 4 and 6, the push plate 771 moves forward until the step on the push plate 771 abuts (contacts) the rear side of the tip end portion 711, which still remains in the groove 523 when the lock pin 71 is disposed at the unlock position, as can be seen in FIG. 4. At this time, the front half of the push plate 771 is disposed rightward of the tip end portion 711 of the lock pin 71 within the slot 520. The lock pin 71 is pressed radially inward by the cam surface 733 of the driving sleeve 73 that is biased in the engagement direction (in the direction of arrow D1). Because the front half of the push plate 771 abuts (contacts) the tip end of the lock pin 71, radially inward movement of the lock pin 71 is blocked in the disengagement position. Thus, the driving sleeve 73 is held in the disengagement position owing to the blocking by the front half of the push plate 771.

In the present embodiment, the driving sleeve 73 is pivotable from the engagement position to the disengagement position by an angle of approximately 45 degrees. Therefore, even when the driving sleeve 73 is placed at (pivoted to) the disengagement position, the protrusion 735 is not positioned directly above the longitudinal axis A1 (the pivot axis of the release drum 81) and the longitudinal axis A2 in the up-down direction. Thus, at whichever position the driving sleeve 73 is located between the engagement position and the disengagement position, the protrusion 735 is offset from (does not overlap) an imaginary plane P1 (see FIGS. 6 and 8) that contains the longitudinal axis A1 and the longitudinal axis A2 and that extends in the up-down direction. More specifically, the protrusion 735 is always located to the right of the plane P1. Further, at whichever position the driving sleeve 73 is located between the engagement position and the disengagement position, the cam part 732 is located at (on) an opposite side of the plane P1 from the protrusion 735. In other words, the cam part 732 is always located to the left of the plane P1. The pivotable angle (pivotable angular range) of the driving sleeve 73 is approximately one half of the pivotable angle (pivotable angular range) of the release drum 81, and the driving sleeve 73 is pivoted in response to approximately the second (rear) half of the pivoting process (pivoting range) of the release drum 81.

As described above, the slider 5 of the present embodiment is oscillated (pivoted, rocked), relative to the body housing 11, the gear housing 12 and the release drum 81, in the up-down direction by the orbital mechanism 6 while the slider 5 is reciprocated in substantially the front-rear direction relative to the body housing 11, the gear housing 12 and the release drum 81. As a result, the positional relationship between the longitudinal axis A1 of the body housing 11 (i.e., the pivot axis of the release drum 81) and the longitudinal axis A2 of the body 51 (i.e., the driving axis of the slider 5) in the up-down direction, and thus the position of the driving sleeve 73 (the protrusion 735) relative to the release drum 81 in the up-down direction, changes depending on the position of the slider 5 in the front-rear direction relative to the body housing 11, the gear housing 12 and the release drum 81. In the present embodiment, the above-described relationship between the protrusion 735 and the plane P1, as well as the above-described relationship between the protrusion 735, the cam part 732, and the plane P1, are satisfied regardless of the position of the slider 5, i.e., regardless of the position of the driving sleeve 73 relative to the release drum 81 in the up-down direction.

When the user releases (stops pushing) the lever 83 (i.e., when the user takes his/her hand off the lever 83), the release drum 81 is pivoted, owing to biasing force of the biasing spring 85 (see FIG. 3), in the counterclockwise direction as viewed from the front side (i.e. in the direction of arrow D1 shown in FIGS. 6 and 8). The protrusion 811 moves away from the protrusion 735 of the driving sleeve 73 without engaging with the protrusion 735 (i.e. disengaged from the protrusion 735) and returns to its initial position (the position shown by the dashed outline in FIG. 6) while the driving sleeve 73 remains held in the disengagement position. In this manner, the release drum 81 pivots from the release position to the initial position without acting on the driving sleeve 73.

Operations of the clamp mechanism 7 and the release mechanism 8 to mount (couple, attach) the blade 91 to the slider 5 are now described.

When the blade 91 is moved rearward and inserted into the slot 520, the push plate 771 is pressed by the rear end of the blade 91 to move rearward against the biasing force of the biasing spring 775. As shown in FIGS. 7 and 8, when the blade 91 reaches a position where the engagement hole 916 of the blade 91 faces the tip end portion 711 of the lock pin 71, the driving sleeve 73 is pivoted in the engagement direction (in the direction of arrow D1) by the biasing force of the biasing spring 75 to move (force) the lock pin 71 to the lock position. The lock pin 71 is held in the lock position owing to the driving sleeve 73 being placed in the engagement position. In this manner, the clamp mechanism 7 of the present embodiment operates in response to the insertion of the blade 91 into the slot 520 and fixes (secures, attaches) the blade 91 to the blade mount part 52. During this period, the release drum 81 is held in its initial position and the protrusion 811 does not engage with the protrusion 735. The release drum 81 thus allows the driving sleeve 72 to pivot from the disengagement position to the engagement position.

As described above, in the reciprocating saw 1 of the present embodiment, when the release drum 81 is pivoted from the initial position to the release position in response to the manipulation of the lever 83, the driving sleeve 73 is pivoted from the engagement position to the disengagement position and to enable (permit) the lock pin 71 to move from the lock position to the unlock position owing to the biasing force of the biasing spring 714. Specifically, the cam part 732 of the driving sleeve 73 is pivoted (rotated) to a position that allows the lock pin 71 to move to the unlock position. Further, the protrusion 735 that is engageable with the protrusion 811 of the release drum 81 is provided on the base portion 731 of the driving sleeve 73, not on the cam part 732. Owing to such a design, the length of protrusion of the protrusion 735 is sufficient for engaging with the protrusion 811, while limiting the overall size of the driving sleeve 73, inclusive of the protrusion 735, in the radial direction. Further, by providing only one protrusion 811 and only one protrusion 735, the protrusions 811 and 735 can be arranged at their optimal positions, and the structures of the release drum 81 and the driving sleeve 73 can be simplified.

In the present embodiment, the orbital mechanism 6 causes (effects, brings about) the orbital motion of the blade 91, thereby increasing the cutting efficiency of the reciprocating saw 1. When the slider 5 is oscillated (pivoted, rocked) in the up-down direction by the orbital mechanism 6 while the slider 5 is being reciprocated, as described above, the positional relationship between the release drum 81 and the driving sleeve 73 in the up-down direction changes.

It is noted that, if the clamp mechanism 7 and the release mechanism 8 were to instead be hypothetically constructed with a plurality of the protrusions 811 and a plurality of the protrusions 735 (i.e. contrary to the present embodiment), an inappropriate engagement between at least one of the protrusions 811 and at least one of the protrusions 735 might be caused as a result of a relative positional change in the up-down direction between the release drum 81 and the driving sleeve 73. In the addition or in the alternative, in another hypothetical structure in which the protrusion 735 were to be disposed directly above or directly below the longitudinal axis A1, a change in the positional relationship between the protrusion 811 and the protrusion 735 is apt to become larger, as compared to a structure in which the protrusion 735 is disposed at any other position. As discussed above, the present embodiment has only one protrusion 811 and only one protrusion 735, and the protrusion 735 is not disposed directly above or directly below the longitudinal axis A1 when the driving sleeve 73 is located at any position between the engagement position and the disengagement position. Consequently, the likelihood of an engagement failure (e.g., insufficient engagement or excessive engagement) between the protrusion 811 and the protrusion 735 can be reduced or eliminated.

In the present embodiment, in the circumferential direction of the release drum 81, the protrusion 811 is arranged generally at the same position as the lever 83 that is movable between the lower end portion and the upper end portion of the lever insertion hole 115. Furthermore, regardless of the position of the slider 5, i.e., regardless of the position of the driving sleeve 73 relative to the release drum 81 in the up-down direction, when the driving sleeve 73 is at the engagement position, the protrusion 735 is at a position that approximately corresponds to the center of the lever insertion hole 115 in the up-down direction, i.e., in an intermediate portion of a travel path of the protrusion 811. The term "intermediate portion" here is not limited to the exact center of the travel path, but may cover a range that includes the center of the travel path and adjacent portions thereof.

Thus, the protrusion 811 engages with the protrusion 735 in an intermediate stage of a process (movement) in which the release drum 81 is pivoted from the initial position to a position for removing the blade 91. Accordingly, when the release drum 81 is at the initial position (i.e., before the lever 83 is manipulated), the likelihood that the protrusion 811 and the protrusion 735 will interfere with each other can be reduced. Such a configuration is preferable especially in an embodiment in which the positional relationship between the release drum 81 and the driving sleeve 73 changes in the up-down direction, as in the present embodiment.

Correspondences between the features of the above-described embodiment and the features of the present disclosure or the invention are as follows. However, the features of the embodiment are merely exemplary, and do not limit the features of the present disclosure or the present invention.

The reciprocating saw 1 is an example of the "reciprocating tool". The body housing 11 and/or the gear housing 12, is (are) a representative, non-limiting example of a "housing". The release drum 81 is an example of a "first tubular member". The lever 83 and the protrusion 811 are representative, non-limiting examples of a "manipulation part" and a "(single) first protrusion", respectively. The longitudinal axis A1 is a representative, non-limiting example of a "first axis". The initial position and the release position of the release drum 81 are representative, non-limiting examples of a "first position" and a "second position", respectively. The slider 5 is a representative, non-limiting example of an "elongate slider". The front end portion of the slider 5 (the blade mount part 52) is a representative, non-limiting example of a "first end portion". The longitudinal axis A2 is a representative, non-limiting example of a "second axis". The blade 91 is a representative, non-limiting example of a "blade". The driving sleeve 73 is a representative, non-limiting example of a "second tubular member". The protrusion 735 is a representative, non-limiting example of a "second protrusion". The engagement position and the disengagement position of the driving sleeve 73 are representative, non-limiting examples of an "engagement position" and a "disengagement position", respectively. The lock pin 71 is a representative, non-limiting example of a "lock member". The lock position and the unlock position are representative, non-limiting examples of a "lock position" and an "unlock position", respectively. The cam part 732 is a representative, non-limiting example of a "protruding portion". The plane P1 is a representative, non-limiting example of a "first plane". The lever insertion hole 115 is a representative, non-limiting example of an "opening".

The above-described embodiment is merely one exemplary embodiment of the present disclosure, and reciprocating tools according to the present disclosure are not limited to the reciprocating saw 1 of the above-described embodiment. For example, the following modifications may be made. Moreover, at least one of these modifications may be employed in combination with at least one of the reciprocating saw 1 of the above-described embodiment and the claimed features.

For example, reciprocating tools according to the present disclosure may be embodied as a jigsaw. In addition or in the alternative, reciprocating saws according to the present disclosure may be driven by electric power supplied via an electric (power) cord connected to an external (e.g., commercial) AC power source, instead of the battery 93, in which case the motor 31 may be an AC motor.

In addition or in the alternative, the mechanism that reciprocates the blade 91 is not limited to the driving mechanism 4. Any known mechanism configured to convert rotation of the motor shaft 315 into linear reciprocating motion and to transmit the reciprocating motion to the blade 91 may be suitably utilized with the present teachings. For example, an oscillating member (a so-called swash bearing or wobble plate) that oscillates in response to rotation of a rotary member may be utilized to perform the motion conversion. In addition or in the alternative, a crank pin of the crank plate may be connected to the slider 5 via a connecting rod, such as in a slider-crank mechanism as mentioned above. The combination and arrangements of the various shafts and gears may be appropriately changed.

Similarly, the mechanism that provides (generates) the orbital motion of the blade 91 is not limited to the orbital mechanism 6. Any known mechanism that acts on the support body 13 or on the slider 5 to cause the orbital motion of the blade 91 may be utilized. For example, a member that is operably connected to the support body 13 and causes the support body 13 to oscillate (pivot, rock) may be disposed separately from the crank plate 45. In addition or in the alternative, a changeover mechanism that changes the action of the orbital mechanism 6 (e.g., a mechanism that selectively changes action modes) may be additionally provided. The expression "change the action of the orbital mechanism" is intended to include, for example, (i) to deactivate the orbital mechanism and (ii) to change an amount by which the slider is oscillated (pivoted) by the orbital mechanism (i.e., to change the orbital path of the blade). Any known mechanism may be utilized as the changeover mechanism. Further, the orbital mechanism 6 may be omitted. In other words, the slider 5 may be only reciprocated by the driving mechanism 4 in the front-rear direction along the longitudinal axis A1 of the body housing 11.

The arrangements of the motor 31, the driving mechanism 4 and the slider 5 within the body housing 11 are not limited to those in the above-described embodiment. For example, the motor 31 may be arranged such that the rotational axis of the motor shaft 15 intersects the longitudinal axis A1 of the body housing 11. In addition or in the alternative, the crank plate 45 may be rotatable around a rotational axis extending in the left-right direction, and the slider 5 may be arranged rightward or leftward of the crank plate 45.

The shapes, the components, the connection structure of the body housing 11 and the handle 18 are not especially limited, and may be appropriately changed. Similarly, the gear housing 12 within the body housing 11 may be appropriately changed according to or regardless of the change of the driving mechanism 4, the slider 5 etc., disposed within the gear housing 12. In addition or in the alternative, a housing having the gear housing 12 at least partly exposed outside may be utilized.

The shape and the components of the slider 5 and the structure for coupling the slider 5 to the driving mechanism 4 are not especially limited and may be appropriately changed. For example, the slider 5 may be formed as a rectangular solid bar. In addition or in the alternative, the slider 5 may be formed by a plurality of components connected together. In addition or in the alternative, a support structure for the slider 5 is not limited to the structure including the support body 13. For example, in an embodiment in which the orbital mechanism 6 is omitted, the slider 5 may be supported by the gear housing 12 (or by the component disposed within the gear housing 12) to be movable (slidable) only in the front-rear direction.

The structures of the clamp mechanism 7 and the release mechanism 8 may be appropriately changed. Optional modifications that can be utilized with the present teachings are described in an exemplary manner below.

For example, it is sufficient that the clamp mechanism 7 includes at least the driving sleeve 73 that is coupled to the front end portion of the slider 5 to be pivotable around the longitudinal axis A2, and the lock pin 71 (or other type of lock member, such as a ball, as discussed below) that is configured to move between the lock position where the lock pin 71 is engageable with the blade 91 and the unlock position where the lock pin 71 is non-engageable the blade 91, in response to the pivoting of the driving sleeve 73 between the engagement position and the disengagement position. Thus, one or more of the other components (the biasing spring 714, the guide sleeve 72, the connection sleeve 74, the biasing spring 75, the push plate 771 etc.) may be appropriately omitted or substituted with another component or components. The shapes, the arrangements and the connection structures of the components of the clamp mechanism 7 may be appropriately changed.

For example, the lock pin 71 may be a rectangular rod-like member, instead of a cylindrical member. Alternatively, a ball may be utilized, instead of the lock pin 71. The shape of the cam part 732 of the driving sleeve 73 may be changed in accordance with the modified lock pin 7 or the ball. In addition or in the alternative, the driving sleeve 73 may be biased by the biasing spring 75 directly, instead of being biased via the connection sleeve 74. In addition or in the alternative, different types of springs may be employed for the biasing springs 714, 75 and 775 in the clamp mechanism 7. For example, the biasing spring 75 may be a compression coil spring, a tension coil spring or a flat spring, instead of the torsion coil spring. The arrangements and the connection structures of the biasing springs 714, 75 and 775 may be appropriately changed, according to or regardless of the above-described change.

The release drum 81 does not need to cover the entire movable range of the driving sleeve 73 in the front-rear direction. For example, the tubular wall 810 may be configured to cover the circumference of the driving sleeve 73 only when the slider 5 is located at a specific position (for example, at the rearmost position or at the foremost position) within the movable range in the front-rear direction. In addition or in the alternative, the biasing spring 85 may be a torsion coil spring, a compression coil spring or a flat spring, instead of the tension coil spring. The arrangement and the connection structure of the biasing spring 85 may be appropriately changed according to or regardless of the above-described change.

The number, the structures (shape, length, thickness (diameter) etc.) and the arrangements of the protrusion 735 of the driving sleeve 73 and the protrusion 811 of the release drum 81 may be changed, as long as the protrusion 735 and the protrusion 811 are configured to engage with each other when the release drum 81 pivots from the initial position to the release position and the protrusion 811 does not interrupt the pivoting of the driving sleeve 73 when the release drum 81 is at the initial position.

In other embodiments according to the present teachings, instead of the single protrusion 735 and the single protrusion 811, a plurality of the protrusions 735 and a plurality of the protrusions 811 optionally may be employed. In other words, the driving sleeve 73 may include at least one protrusion 735 and the release drum 81 may include at least one corresponding protrusion 811. In an embodiment in which the multiple protrusions 735 and the multiple protrusions 811 are provided, at least one of the protrusions 735 of the driving sleeve 73 is preferably disposed on a portion (e.g., the base portion 731) of the tubular wall 730 other than the cam part 732.

Contrary to the above-described embodiment, the protrusion 811 may instead be longer than the protrusion 735. In addition or in the alternative, the protrusion 735 of the driving sleeve 73 may be offset from the position exemplarily described in the embodiment in the clockwise direction or in the counterclockwise direction. In an embodiment in which the reciprocating saw 1 includes the orbital mechanism 6 (i.e., the reciprocating saw 1 has an action mode for the orbital motion of the blade 91), however, it may be preferable that the protrusion 735 is always offset from the plane P1, regardless of the position of the driving sleeve 73. Further, in an embodiment in which the reciprocating saw 1 includes the orbital mechanism 6, it may be preferable that the protrusion 735 and the protrusion 811 are spaced apart from each other when the driving sleeve 73 is at the engagement position and the release drum 81 is at the initial position.

The positional relationship between the lever 83 and the protrusion 811 of the release drum 81 is not limited to the exemplary positional relationship in the above-described embodiment. For example, the lever 83 and the protrusion 811 may be at different positions in the circumferential direction of the tubular wall 810 (i.e., spaced apart from (offset from) each other in the circumferential direction). In addition or in the alternative, the position and the shape of the lever insertion hole 115 may be appropriately changed. In addition or in the alternative, the movable range of the lever 83 (i.e., the angle by which the release drum 81 can be pivoted) and the arrangements of the lever 83 and the protrusion 811 may be changed according to the change of the lever insertion hole 115.

In view of the nature of the present disclosure, the above-described embodiment and the modifications thereof, the following Aspects 1 to 7 are disclosed. One or more of Aspects 1 to 7 may be employed in combination with at least one of the above-described embodiment, the modifications thereof, and the claimed features.

(Aspect 1)
A tip end of the second protrusion is located radially outward of an intermediate position between an inner peripheral surface of the first tubular member and an inner peripheral surface of the second tubular member.

(Aspect 2)
The distance between the second axis and the tip end of the second protrusion is longer than the distance between the second axis and an outer surface of a portion of the protruding portion that protrudes the most radially outward in the radial direction of the second tubular member.

(Aspect 3)
The second tubular member includes a tubular wall that has a substantially uniform thickness and surrounds (encircles) the second axis, and the protruding portion is a portion of the tubular wall.

(Aspect 4)
The remaining portion of the second tubular member other than the protruding portion defines a portion of a hollow cylinder centered around the second axis.

(Aspect 5)
The reciprocating tool further comprises a first spring that biases the first tubular member toward the first position.

(Aspect 6)
The reciprocating tool further comprises a second spring that biases the second tubular member toward the engagement position.

(Aspect 7)
The reciprocating tool further comprises a third spring that biases the lock member toward the unlock position.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved reciprocating tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

DESCRIPTION OF THE REFERENCE NUMERALS

1: reciprocating saw, 11: body housing, 111: opening, 113: shoe, 115: lever insertion hole, 12: gear housing, 121: opening, 13: support body, 130: support hole, 131: sliding bearing, 132: sliding bearing, 141: pin, 145: bearing, 18: handle, 181: grip portion, 182: trigger, 183: switch, 187: battery housing, 30: controller, 31: motor, 311: body part, 315: motor shaft, 316: pinion gear, 4: driving mechanism, 41: intermediate shaft, 43: bevel gear, 45: crank plate, 451: crank pin, 455: connection member, 5: slider, 51: body, 52: blade mount part, 520: slot, 521: first hole, 522: second hole, 523: groove, 55: pin connection portion, 551: guide recess, 6: orbital mechanism, 61: cam part, 63: biasing member, 7: clamp mechanism, 70: pin holding hole, 71: lock pin, 711: tip end portion, 712: head portion, 714: biasing spring, 72: guide sleeve 721: first hole, 722: second hole, 723: pin, 73: driving sleeve, 730: tubular wall, 731: base portion, 732: cam part, 733: cam surface, 735: protrusion, 737: retaining ring, 74: connection sleeve, 75: biasing spring, 771: push plate, 775: biasing spring, 8: release mechanism, 81: release drum, 810: tubular wall, 811: protrusion, 813: connection portion, 83: lever, 85: biasing spring, 91: blade, 911: plate surface, 913: cutting edge, 915: base end portion, 916: engagement hole, 93: battery, A1: longitudinal axis, A2: longitudinal axis, L: straight line, P1: plane, P2: plane

What is claimed is:

1. A reciprocating tool comprising:
a housing;
a first tubular member supported by the housing to be pivotable around a first axis between a first position and a second position, the first axis defining a front-rear direction of the reciprocating tool, and the first tubular member including a manipulation part configured to be manipulated from outside the housing and a single first protrusion protruding radially inward from an inner peripheral surface of the first tubular member;
an elongate slider having a second axis and supported within the housing to be reciprocated at least substantially in the front-rear direction along the second axis, the slider having a first end portion configured to removably receive a blade;
a second tubular member disposed radially inward of the first tubular member and coupled to the first end portion of the slider to be pivotable around the second axis between an engagement position and a disengagement position, the second tubular member having a single second protrusion protruding radially outward from an outer peripheral surface of the second tubular member; and
a lock member disposed radially inward of the second tubular member and configured to move in a radial direction of the second tubular member between a lock position at which the lock member is engageable with the blade and an unlock position at which the lock member is non-engageable with the blade, in response to pivoting of the second tubular member between the engagement position and the disengagement position, wherein:
the second tubular member has a cam part extending partially along a periphery of the second tubular member in a circumferential direction around the second axis and protruding radially outward of a remaining portion of the second tubular member, the cam part being configured to provide space in the radial direction for the lock member to move to the unlock position,
the cam part has an inner peripheral surface that contacts a head portion of the lock member and is configured to move the lock member from the unlock position to the lock position as the second tubular member is pivoted from the disengagement position to the engagement position,
the single first protrusion is configured to engage with the single second protrusion and cause the second tubular member to pivot from the engagement position to the disengagement position while the first tubular member is pivoting from the first position to the second position in response to manipulation of the manipulation part,
the single first protrusion is configured such that the second tubular member is pivotable without engaging with the single second protrusion while the first tubular member is disposed at the first position, and
the single second protrusion is provided on a portion of the second tubular member other than the cam part.

2. The reciprocating tool as defined in claim 1, wherein the single second protrusion is configured to be disposed in an intermediate portion of a path along which the single first protrusion travels while the first tubular member is pivoting from the first position to the second position and the second tubular member is at the engagement position.

3. The reciprocating tool as defined in claim 2, wherein:
the elongate slider is configured to impart an orbital motion to the blade by oscillating in an up-down direction orthogonal to the first axis while reciprocating at least substantially in the front-rear direction along the second axis, and
the single second protrusion is configured to move within a range that is offset from a first plane containing the first axis and extending in the up-down direction, regardless of a position of the second tubular member, in response to the pivoting of the second tubular member between the engagement position and the disengagement position.

4. The reciprocating tool as defined in claim 3, wherein the cam part and the single second protrusion are disposed on opposite sides of the first plane while the second tubular member is located at any position between the engagement position and the disengagement position.

5. The reciprocating tool as defined in claim 4, wherein:
the manipulation part protrudes radially outward from an outer peripheral surface of the first tubular member, and
the single first protrusion is located at approximately the same position in a circumferential direction of the first tubular member as the manipulation part.

6. The reciprocating tool as defined in claim 5, wherein:
the housing has an opening that extends in an up-down direction orthogonal to the first axis and exposes the manipulation part to outside the housing,
the manipulation part is movable between a lower end portion and an upper end portion of the opening in response to the manipulation of the manipulation part, and
when the second tubular member is at the engagement position, the single second protrusion is at a position corresponding to a central portion of the opening in the up-down direction.

7. The reciprocating tool as defined in claim 6, wherein the single first protrusion is configured to engage with the single second protrusion in response to the pivoting of the first tubular member from the first position to the second position, regardless of the position of the slider in the front-rear direction.

8. The reciprocating tool as defined in claim 7, wherein:
the first end portion of the slider has a slot for receiving an end portion of the blade,
a push plate is disposed in the slot between a closed end of the slot and the locking member,
a spring member is disposed in the slot between the closed end of the slot and the push plate, the spring member forwardly biasing the push plate,
a forward end of the push plate has a stepped shape configured such that an extension of the push plate is one-half or less of the thickness of a main body of the push plate, and
the push plate and spring member are configured such that, when the blade is withdrawn from the slot, the extension is pushed by the spring member to a position between a tip end of the lock member and an opposing side of the slot, thereby blocking the lock member from fully returning to the lock position, even if the second tubular member is pivoted around the second axis towards the engagement position.

9. The reciprocating tool as defined in claim 2, wherein:
the manipulation part protrudes radially outward from an outer peripheral surface of the first tubular member, and
the single first protrusion is located at approximately the same position in a circumferential direction of the first tubular member as the manipulation part.

10. The reciprocating tool as defined in claim 9, wherein:
the housing has an opening that extends in an up-down direction orthogonal to the first axis and exposes the manipulation part to outside the housing,
the manipulation part is movable between a lower end portion and an upper end portion of the opening in response to the manipulation of the manipulation part, and
when the second tubular member is at the engagement position, the single second protrusion is at a position corresponding to a central portion of the opening in the up-down direction.

11. The reciprocating tool as defined in claim 2, wherein the single first protrusion is configured to engage with the single second protrusion in response to the pivoting of the first tubular member from the first position to the second position, regardless of the position of the slider in the front-rear direction.

12. The reciprocating tool as defined in claim 2, wherein:
the first end portion of the slider has a slot for receiving an end portion of the blade,
a push plate is disposed in the slot between a closed end of the slot and the locking member, and
a spring member is disposed in the slot between the closed end of the slot and the push plate, the spring member forwardly biasing the push plate.

13. The reciprocating tool as defined in claim 12, wherein:
a forward end of the push plate has a stepped shape configured such that an extension of the push plate is one-half or less of the thickness of a main body of the push plate, and
the push plate and the spring member are configured such that, when the blade is withdrawn from the slot, the extension is pushed by the spring member to a position between a tip end of the lock member and an opposing side of the slot, thereby blocking the lock member from fully returning to the lock position, even if the second tubular member is pivoted around the second axis towards the engagement position.

14. A reciprocating tool comprising:
a housing;
a first tubular member supported by the housing to be pivotable around a first axis between a first position and a second position, the first axis defining a front-rear direction of the reciprocating tool, and the first tubular member including a manipulation part configured to be manipulated from outside the housing and a first protrusion protruding radially inward from an inner peripheral surface of the first tubular member;
an elongate slider having a second axis and supported within the housing to be reciprocated at least substantially in the front-rear direction along the second axis, the slider having a first end portion configured to removably receive a blade;
a second tubular member disposed radially inward of the first tubular member and coupled to the first end portion of the slider to be pivotable around the second axis between an engagement position and a disengagement position, the second tubular member having a second protrusion protruding radially outward from an outer peripheral surface of the second tubular member; and
a lock member disposed radially inward of the second tubular member and configured to move in a radial direction of the second tubular member between a lock position at which the lock member is engageable with the blade and an unlock position at which the lock member is non-engageable with the blade, in response to pivoting of the second tubular member between the engagement position and the disengagement position,
wherein:
the second tubular member has a cam part extending partially along a periphery of the second tubular member in a circumferential direction around the second axis and protruding radially outward of a remaining portion of the second tubular member, the cam part being configured to provide space in the radial direction for the lock member to move to the unlock position,
the cam part has an inner peripheral surface that contacts a head portion of the lock member and is configured to move the lock member from the unlock position to the lock position as the second tubular member is pivoted from the disengagement position to the engagement position,
the first protrusion is configured to engage with the second protrusion and cause the second tubular member to pivot from the engagement position to the disengagement position while the first tubular member pivoting from the first position to the second position in response to manipulation of the manipulation part,
the first protrusion is configured to allow the second tubular member to pivot without engaging with the second protrusion when the first tubular member is at the first position,
the second protrusion is provided on a portion of the second tubular member other than the cam part, and
the elongate slider is configured to impart an orbital motion to the blade by oscillating in an up-down direction orthogonal to the first axis while reciprocating at least substantially in the front-rear direction along the second axis.

15. The reciprocating tool as defined in claim 14, wherein:
the single second protrusion is configured to be disposed in an intermediate portion of a path along which the single first protrusion travels while the first tubular member is pivoting from the first position to the second position and the second tubular member is at the engagement position, and
the second protrusion is configured to move within a range that is offset from a first plane containing the first axis and extending in the up-down direction, regardless of the position of the second tubular member, in response to the pivoting of the second tubular member between the engagement position and the disengagement position.

16. A reciprocating tool comprising:
a housing defining a first longitudinal axis;
an elongate slider slidably supported within the housing to undergo reciprocating motion at least substantially in a front-rear direction of the reciprocating tool, the slider defining a second longitudinal axis and having a first end portion comprising a blade mount part configured to removably receive a blade; and
a blade clamp system including:
  a first tubular member supported by the housing to be pivotable around the first longitudinal axis between a first position and a second position and held by the housing such that the slider is reciprocally movable in the front-rear direction relative to the first tubular member, the first tubular member having a blade clamp lever configured to be manually manipulated from outside the housing and a single first protrusion protruding radially inward from an inner peripheral surface of the first tubular member;
  a second tubular member disposed radially inward of and at least substantially surrounded by the first tubular member, the second tubular member (i) being coupled to the first end portion of the slider, (ii) being pivotable around the second longitudinal axis between an engagement position and a disengagement position, and (iii) having a single second protrusion protruding radially outward from an outer peripheral surface of the second tubular member; and
  a lock member disposed radially inward of the second tubular member and configured to move, in response to pivoting of the second tubular member between the engagement position and the disengagement position, in a radial direction of the second tubular member between a lock position at which the lock member is engageable with the blade and an unlock position at which the lock member is non-engageable with the blade;
wherein:
the second tubular member has a cam part that extends partially along a periphery of the second tubular member in a circumferential direction around the second longitudinal axis and has an inner peripheral surface that contacts a head portion of the lock member, the cam part being configured to move the lock member from the unlock position to the lock position as the second tubular member is pivoted from the disengagement position to the engagement position,
the single first protrusion is configured to engage with the single second protrusion and cause the second tubular member to pivot from the engagement position to the disengagement position while the first tubular member is pivoting from the first position to the second position in response to manual manipulation of the blade clamp lever,
the single first protrusion is configured such that, while the first tubular member is disposed at the first position, the second tubular member is pivotable without the single second protrusion engaging the single first protrusion,
the single second protrusion is provided on a portion of the second tubular member other than the cam part, and
the cam part of the second tubular member protrudes radially outward of a remaining portion of the second tubular member.

17. The reciprocating tool as defined in claim 16, wherein:
the inner peripheral surface of the cam part is increasingly spaced farther from the second longitudinal axis than the remaining portion of the second tubular member,
a biasing member biases the lock member radially outward, and
pivoting of the second tubular member from the engagement position to the disengagement position causes the lock member to move radially outward owing to the biasing force of the biasing member.

18. The reciprocating tool as defined in claim 17, wherein:
the slider is configured to undergo oscillating motion in an up-down direction that is perpendicular to the front-rear direction while the slider is being reciprocated at least substantially in the front-rear direction, and
while the slider is undergoing the oscillating motion in the up-down direction, the second tubular member also oscillates in the up-down direction relative to the first tubular member.

19. The reciprocating tool as defined in claim 18, further comprising:
a support body disposed within the housing and being pivotably coupled to the housing via a pivot axis,
  wherein the support body is configured to be pivoted around the pivot axis while the slider is being reciprocated in at least substantially the front-rear direction to generate the oscillating motion in the up-down direction.

20. The reciprocating tool as defined in claim 19, wherein:
the single second protrusion is configured to move within a range that is offset from a first plane containing the first longitudinal axis and extending in the up-down direction, regardless of a position of the second tubular member, in response to the pivoting of the second tubular member between the engagement position and the disengagement position,
the cam part and the single second protrusion are disposed on opposite sides of the first plane while the second tubular member is located at any position between the engagement position and the disengagement position, and
the single first protrusion is configured to engage with the single second protrusion in response to the pivoting of the first tubular member from the first position to the second position, regardless of the position of the slider in the front-rear direction.

* * * * *